United States Patent [19]

Meki et al.

[11] Patent Number: 6,041,066

[45] Date of Patent: Mar. 21, 2000

[54] METHOD OF SYNCHRONIZATION STATUS MESSAGE PROCESSING IN TRANSMISSION APPARATUS

[75] Inventors: Seiji Meki; Shunji Yamada, both of Kanagawa; Junichi Moriyama, Kawasaki, all of Japan

[73] Assignee: Fujitsu Limited, Kanagawa, Japan

[21] Appl. No.: 09/022,429

[22] Filed: Feb. 12, 1998

[30] Foreign Application Priority Data

Jan. 9, 1997 [JP] Japan .................................. 9-235759

[51] Int. Cl.[7] ....................................................... H04J 3/06
[52] U.S. Cl. .......................................................... 370/512
[58] Field of Search .................................... 370/438, 439, 370/503, 509, 510, 512; 375/354, 356

[56] References Cited

U.S. PATENT DOCUMENTS

| | | | |
|---|---|---|---|
| 4,727,539 | 2/1988 | Arita et al. ............................. | 370/503 |
| 5,241,543 | 8/1993 | Amada et al. .......................... | 370/503 |
| 5,327,402 | 7/1994 | Shinomiya ............................. | 370/503 |
| 5,333,299 | 7/1994 | Koval et al. ........................... | 370/503 |
| 5,361,260 | 11/1994 | Mito ..................................... | 370/503 |

FOREIGN PATENT DOCUMENTS 6125354  5/1994  Japan .

*Primary Examiner*—Ricky Ngo
*Attorney, Agent, or Firm*—Helfgott & Karas, P.C.

[57] ABSTRACT

A transmission apparatus has units to which main signals are input for subjecting these main signals to predetermined processing and then transmitting them. One of these units is a master unit and the others are slave units and they are interconnected by a clock cable and processor-to-processor cable. Each slave unit detects a synchronization status message that has been inserted into a main signal input from a line and notifies the main unit of this synchronization status message via the processor-to-processor cable. Using synchronization status messages acquired from the slave units and a synchronization status message that has been inserted into a main signal input thereto, the main unit obtains the synchronization status message indicative of the best quality level and adopts, as a master clock, a clock extracted from the main signal into which this synchronization status message has been inserted.

12 Claims, 18 Drawing Sheets

FIG.17 PRIOR ART

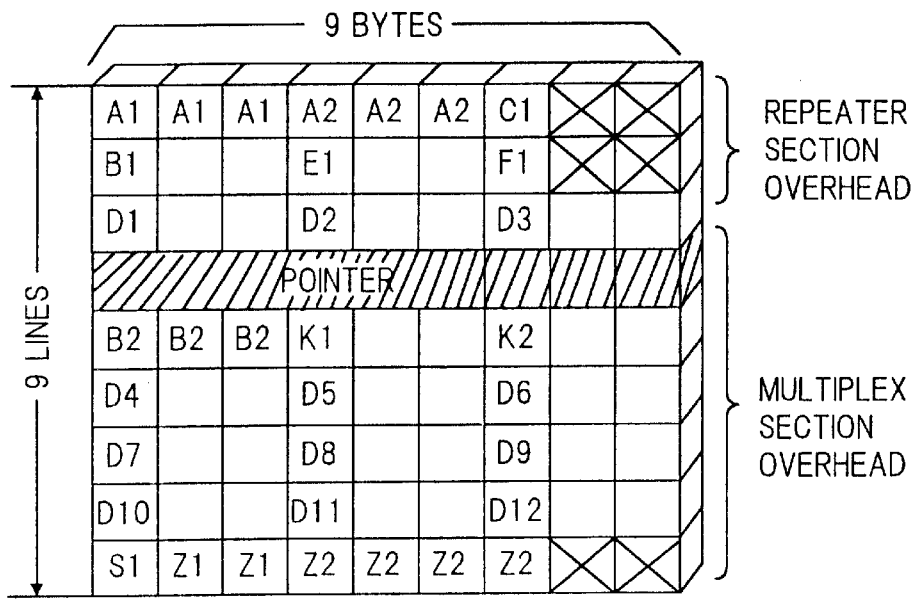

FIG.18 PRIOR ART

| | SYMBOL | APPLICATION IN NNI |
|---|---|---|
| REPEATER SECTION OVERHEAD | A1, A2 | FRAME SYNCHRONISM |
| | C1 | IDENTIFICATION NUMBER OF EACH STM-1 IN STM-N |
| | B1 | ERROR MONITORING IN REPEATER SECTION |
| | E1 | AUDIO ARRANGEMENTS IN REPEATER SECTION |
| | F1 | MALFUNCTION SPECIFICATION IN REPEATER SECTION |
| | D1~D3 | DATA COMMUNICATION IN REPEATER SECTION |
| MULTIPLEX SECTION OVERHEAD | B2 | SECTION ERROR MONITORING |
| | K1 | CONTROL OF CHANGEOVER SYSTEM |
| | K2 | TRANSFER OF MULTIPLEX SECTION STATUS |
| | D4~D12 | DATA COMMUNICATION IN MULTIPLEX SECTION |
| | S1 | QUALITY OF CLOCK Sync Msg |
| | Z1 | MULTIPLEX STANDBY |
| | Z2 | NOTIFICATION OF MULTIPLEX ERROR STATUS |
| | B2 | AUDIO ARRANGEMENTS IN MULTIPLEX SECTION |

FIG.19 PRIOR ART

| Description | Acronym (Sync Msg) | Quality Level | CONTENT |
|---|---|---|---|
| PRS Traceable | PRS | 1 | CLOCK ACCURACY OF ± $10^{-11}$ |
| Synchronized-Traceability Unknown | STU | 2 | ACCURACY INDETERMINATE (FOR APPARATUS WHICH DOES NOT SUPPORT SYNC MESSAGE) |
| Traceable Stratum 2 Holdover | ST2 | 3 | CLOCK ACCURACY OF ± $1.6 \times 10^{-8}$ |
| Traceable Stratum 3 Holdover | ST3 | 4 | CLOCK ACCURACY OF ± $4.6 \times 10^{-6}$ |
| Traceable SONET Clock Self Timed | SIC | 5 | CLOCK ACCURACY OF ± $20 \times 10^{-6}$ |
| Traceable Stratum 4 Free-Run | ST4 | 6 | CLOCK ACCURACY OF ± $32 \times 10^{-6}$ |
| DON'T USE for Sync | DUS | 7 | UNUSABLE AS REFERENCE CLOCK |
| Reserved for Network Synchronization Use | RES | user assignable | (RESERVED FOR NETWORK SYNCHRONIZATION USE) |

METHOD OF SYNCHRONIZATION STATUS MESSAGE PROCESSING IN TRANSMISSION APPARATUS

BACKGROUND OF THE INVENTION

This invention relates to a method of synchronization status message processing in a transmission apparatus. More particularly, the invention relates to a method of synchronization status message processing in a transmission apparatus in which a clock extracted from a main signal in which a synchronization status message indicating the best quality level has been inserted is adopted as a master clock and signal processing is executed in synchronization with the master clock.

The world-wide trend toward the adoption of SDH (Synchronous Digital Hierarchy) for networks in optical transmission is continuing. FIG. 15 is a diagram for describing the structure of a frame in accordance with the SONET (Synchronous Optical Network) standard, which is the synchronous network communications standard used in North America. This is for a case where the transmission rate is 155.52 Mbps. One frame is composed of 9×270 bytes. The first 9×9 bytes constitute section overhead (SOH), and the remaining bytes constitute path overhead (POH) and payload (PL), the latter being a section which transmits information at 150 Mbps.

The section overhead SOH is composed of repeater section overhead of 3×9 bytes, a pointer of 1×9 bytes and multiplex section overhead of 5×9 bytes. As shown in FIG. 16, the multiplex section is the section between terminal repeater units 1, 2. In a case where a number of transmission lines 3a~3c and repeaters 4a, 4c are provided between the terminal repeater units 1, 2, the repeater section is the section between both ends of one transmission line, and the multiplex section is composed of a plurality of repeater sections.

As shown in FIG. 17, the repeater section overhead has bytes A1~A2, C1, B1, E1, F1, D1~D3, and the multiplex section overhead has bytes B2, K1~K2, D4~D12, S1, Z1~Z2. The meaning of each byte is illustrated in FIG. 18. The repeater section overhead transmits frame synchronizing signals (bytes A1, A2), an error monitoring signal (byte B1) for monitoring error in the repeater section, a fault specifying signal (byte F1) for specifying a fault in the repeater section, etc. The multiplex section overhead transmits an error monitoring signal (byte B2) for monitoring error in the section, a changeover signal (byte K1) for switching between a standby system and a working system, a transfer signal (byte K2) for transferring the status in the multiplex section and a synchronization status message Sync Msg (S1 byte).

The synchronization status message Sync Msg is a message indicating the quality level (accuracy) of the clock. In order to construct a synchronous network in an SDH network, this message is sent and received using the overhead (S1 byte) of the SONET signal or the data link of an ESF DS1 signal. The transmission apparatus selects, as a master clock (reference clock), the clock having the best quality from among a plurality of input clocks and transmits data in sync with the master clock.

FIG. 19 is a table for describing the synchronization status message Sync Msg and quality level. The correspondence among eight synchronization status messages (PRS, STU, ST2, ST3, SIC, ST4, DUS, RES), their quality levels and clock accuracies is stipulated. The synchronization status messages ST2, ST3 indicate the quality levels of holdover (HO) clocks. When external supply of a clock ceases, an HO clock is created within the apparatus based upon the master clock that was in use immediately before the cessation of the external clock. The created clock is used within the apparatus. The synchronization status message ST4 is an internal (INT) clock. This is created independently within the apparatus and is used when the HO clock cannot be used. The DUS (Don't Use for Sync) synchronization status message indicates that the clock is not usable as the master clock.

FIG. 20 is a diagram useful in describing the clock selecting operation of a transmission apparatus NE. The left side of the transmission apparatus NE serves as a LINE1 side and the right side as a LINE2 side.

The transmission apparatus NE includes a quality acquisition/setting unit QRS. The quality acquisition/setting unit QRS (1) identifies/acquires the quality of each input clock based upon a synchronization status message set in the overhead S1 byte of a main signal in the UP direction input from the LINE1 side and of a main signal in the DOWN direction input from the LINE2 side, and (2) sets a synchronization status message, which indicates the quality of the master clock, in the overhead S1 byte of a main signal in the UP direction output from the LINE2 side and of a main signal in the DOWN direction output from the LINE1 side, and transmits the message.

The transmission apparatus NE further includes a CPU, which is a processor for comparing the quality levels of the clocks acquired by the quality acquisition/setting unit QRS and adopting the clock having the best quality as the master clock, and a master clock selector MCS which, in response to an indication from the CPU, selects the clock having the highest quality level as the master clock.

The transmission apparatus NE sets the synchronization status message indicating the quality of the master clock in the overhead S1 byte of the main signal sent in the UP direction and, in sync with this master clock, sends the main signal in the UP direction from the LINE2 side. Further, the transmission apparatus NE sets the synchronization status message indicating the quality of the master clock in the overhead S1 byte of the main signal sent in the DOWN direction and, in sync with this master clock, sends the main signal in the DOWN direction from the LINE1 side.

The foregoing is for the case of normal operation. If a fault develops in the master clock selector MCS, it is no longer possible to assure that the quality level of the master signal will be the best. Accordingly, in order to arrange it so that this master clock will not be usable in another transmission apparatus connected to the network, the quality acquisition/setting unit QRS adopts DUS (Don't Use for Sync) as the synchronization status message set in the overhead S1 byte of the main signals in the UP and DOWN directions.

In this connection, certain problems arise in the prior art.
(1) Conventionally, one transmission apparatus is constituted by one shelf and control of the clock is carried out by one CPU. Though the sending and receiving of synchronization status messages in a one-shelf/one transmission apparatus arrangement is stipulated by the SONET standard, there is no stipulation concerning the processing of synchronization status messages in an arrangement in which one transmission apparatus is composed of a plurality of shelves. Such processing needs to be stipulated.

More specifically, it is recent practice to construct one system (transmission apparatus) from a plurality of shelves and partition the shelves into a master shelf (MASTER) which performs overall management of the apparatus, and slave shelves (SLAVE) which operate under the control of the master shelf. Each shelf is equipped with a CPU for executing clock control. Overall clock control is performed by the CPU of the master shelf. In a transmission apparatus having a plurality of shelves, a main signal is input to each shelf, meaning that a large number of main signals enter the apparatus. The master shelf acquires the synchronization status messages and clocks of these main signals, identifies the qualities of the clocks from the synchronization status messages, selects the clock having the best quality as the master clock and sends the master clock to each shelve, thereby synchronizing the shelves. To this end, the overhead S1 bytes are transmitted, along with the clocks, from the slave shelves to the master shelf via a clock delivery cable, and the master shelf is made to implement the synchronization status message function. With this method, however, the master shelf must sense the synchronization status messages and identify the clock qualities. The result is an increase in the load upon the master shelf.

(2) In a transmission apparatus having a plurality of shelves, the master shelf incorporates a unit (a system timing processing unit) which decides the master clock and sends it to each of the shelves. If this unit fails, there will no longer be any assurance that the quality of the master clock is the best. If this clock is used as the master clock in another transmission apparatus, network synchronization will be lost.

(3) Each slave shelf has a unit for selecting and processing the master clock sent from the master shelf. If this unit fails, there will no longer be any assurance that the master clock selected by this unit is that having the best quality. If this clock is used as the master clock in another transmission apparatus, network synchronization will be lost.

(4) If the cable for sending the master clock from the master shelf to a slave shelf is severed, the slave shelf executes processing in sync with the HO (holdover) clock or INT (internal) clock. This makes it necessary to insert a synchronization status message indicating the quality of the HO (holdover) clock or the quality of the INT (Internal) clock in the overhead S1 byte of the main signal sent from the shelf. However, the insertion of such a synchronization status message cannot be carried out in a simple manner.

(5) When processing for deciding the master clock is being carried out by the master shelf, what master clock should be used by the shelves is unclear. Accordingly, for the short period of time during which the master clock decision processing is being executed, a self-timing clock such as the HO (holdover) clock or INT (Internal) clock is used as a reference clock. After the master clock is selected, a state is attained in which this master clock is used. More specifically, the shelves use three types of clocks by switching among them in a short period of time. Whenever the clock used is switched over in such case, a synchronization status message which indicates the quality of this clock is inserted into the main signal. Since quality is changed over in a short period of time, however, changeover of the master clock occurs frequently in the other stations of the network as well. This leads to instability of the overall network and loss of network synchronization.

SUMMARY OF THE INVENTION

Accordingly, an object of the present invention is to lighten the load on the master shelf by dispersing the synchronization status message detection processing among the shelves (the master shelf and slave shelves).

Another object of the present invention is to lighten the load on the shelves, especially the master shelf, by sending and receiving synchronization status messages indicating quality via a processor interconnecting cable between the master shelf and slave shelves only when the quality of a clock changes or only when the quality of the master clock changes, and refraining from sending and receiving synchronization status messages if there is no change in quality.

Another object of the present invention is to prevent loss of synchronization in a network by so arranging it that another transmission apparatus will not use a master clock even if the unit of the master that decides the master clock malfunctions.

A further object of the present invention is to prevent loss of synchronization in a network by so arranging it that another transmission apparatus will not use a clock, which is contained in a main signal sent from a slave shelf, even if the unit of the master shelf that selects and processes the master clock sent from the master shelf malfunctions.

Still another object of the present invention is to set synchronization status messages, which indicate the qualities of the clocks, in the overhead S1 bytes of main signals sent from slave shelves even in a case where the cable for sending the master clock is severed and slave shelves use the HO clock or INT clock as the reference clock.

Yet another object of the present invention is to prevent unnecessary changeover of clocks within a network, as well as loss of synchronization in the network, by so arranging it that even when a self-timing clock such as the HO clock or INT clock is being used as a reference clock during the execution of processing to decide the master clock, a synchronization status message indicating the quality of this clock is not transmitted.

In accordance with the present invention, the foregoing objects are attained by connecting a master unit and slave units by a clock cable which sends and receives a clock and a processor interconnecting cable for communication between processors, causing a slave unit to identify a synchronization status message that has been inserted into a main signal input from a line and notify the master unit of this synchronization status message via the processor interconnecting cable, causing a processor in the master unit to obtain a synchronization status message indicating best quality using the synchronization status message acquired from the slave unit, and adopt, as a master clock, a clock extracted from a main signal in which the synchronization status message obtained has been inserted. In other words, in accordance with the present invention, processing for detecting synchronization status messages can be distributed among the master units and slave units. As a result, the master unit is capable of acquiring synchronization status messages from slave units via the processor interconnecting cable and of deciding a master clock merely by comparing the quality levels.

In accordance with the present invention, the foregoing objects are attained by causing the slave unit to notify the master unit of a new synchronization status message via the processor interconnecting cable only when content of a synchronization status message that has been inserted into a main signal changes, and causing the master unit to start processing for deciding a master clock in response to reception of the synchronization status message. In other words, in accordance with the present invention, synchronization status messages indicating the quality of a master clock are sent and received between the master unit and slave unit only when the quality of the master clock has changed. Synchronization status messages are not sent and received if there is no change in quality. This makes it possible to lighten the load on the shelves, especially the load on the master unit.

In accordance with the present invention, the foregoing objects are attained by causing each unit to perform signal processing using a clock internally generated by the unit itself during processing to decide a master clock, and to inhibit notification of the master unit of a synchronization status message indicating the quality of this clock. In other words, in accordance with the present invention, even when a self-timing clock such as a holdover clock or internal clock is being used as a reference clock during the execution of processing to decide the master clock, the master unit is not notified of a synchronization status message indicating the quality of this clock. As a result, during the short period of time over which processing for deciding the master clock is executed, a synchronization status message indicating the quality of a clock is not sent to another transmission apparatus in the network. This other transmission apparatus, therefore, can maintain network synchronization without needless changeover of clocks.

In accordance with the present invention, the foregoing objects are attained by internally providing the master unit with a clock processor for receiving clocks from slave units and sending the slave units a clock decided upon as the master clock from these clocks, causing the master unit to monitor occurrence of failure of the clock processor, and, in the event detection of failure of the clock processor, causing the master unit to notify slave units of occurrence of the failure, and causing the master unit and slave units to cooperate in inserting, into all main signals sent from the transmission apparatus, a synchronization status message DUS indicating that the clocks included in these main signals are not usable. In other words, in accordance with the present invention, it is so arranged that another transmission apparatus in the network cannot use a clock included in a main signal sent from a transmission apparatus whose clock processor has malfunctioned. This makes it possible to prevent loss of network synchronization.

In accordance with the present invention, the foregoing objects are attained by internally providing the slave unit with a clock processor (system timing processor) for extracting a clock from a main signal, transmitting the clock to the master unit and executing signal processing using a master clock sent from the master unit, causing the slave unit to monitor occurrence of failure of the clock processor, and, in the event of detection of failure of the clock processor, causing the slave unit to notify the master unit of occurrence of the failure via the processor interconnecting cable, and causing the master unit to cooperate with the slave units in inserting, into all main signals sent from slave units, a synchronization status message DUS indicating that the clocks included in these main signals are not usable. In other words, in accordance with the present invention, it is so arranged that if the clock processor of a slave unit malfunctions, another transmission apparatus in the network cannot extract and use a clock included from a main signal sent from the slave unit. This makes it possible to prevent loss of network synchronization.

In accordance with the present invention, the foregoing objects are attained by causing the slave unit to monitor occurrence of failure of a clock cable, and, in the event of detection of failure of the clock cable, causing the slave unit to perform signal processing using a clock internally generated by the slave unit itself and to notify the master unit, via the processor interconnecting cable, of a synchronization status message indicating the quality level of this clock, and causing the master unit and slave units to cooperate in inserting the synchronization status message of which notification has been given into all main signals sent from the slave units. In other words, in accordance with the present invention, it is so arranged that even if a cable for sending the master clock is severed and slave units use the holdover clock or internal clock, synchronization status messages indicating the qualities of these clocks can be inserted into main signals sent from the slave units.

Other features and advantages of the present invention will be apparent from the following description taken in conjunction with the accompanying drawings.

BRIEF DESCRIPTION OF THE DRAWINGS

FIG. 17 is a diagram showing the constitution of section overhead according to the prior art;

FIG. 18 is a diagram showing the meaning of each byte in section overhead according to the prior art;

FIG. 19 is a table useful in describing synchronization status messages and their quality levels according to the prior art.

DESCRIPTION OF THE PREFERRED EMBODIMENTS (A) Overall Construction of Transmission Apparatus to which Invention is Applicable (a) Overall Construction FIG. 1 is a diagram showing the overall construction of a transmission apparatus NE to which the present invention can be applied. The apparatus is equipped with two shelves, namely a master shelf (master unit) 11 and a slave shelf (slave unit) 21. Main signals enter the master shelf 11 from respective ones of two lines (e.g. working and standby lines) $1m_1$, $1m_2$ for the UP direction, are subjected to predetermined processing and are sent from two lines $2m_1$, $2m_2$ for the UP direction. Main signals enter the slave shelf 21 from respective ones of two lines (e.g. working and standby lines) $2s_1$, $2s_2$ for the DOWN direction, are subjected to predetermined processing and are sent from two lines $1s_1$, $1s_2$ for the DOWN direction.

Figure 1:
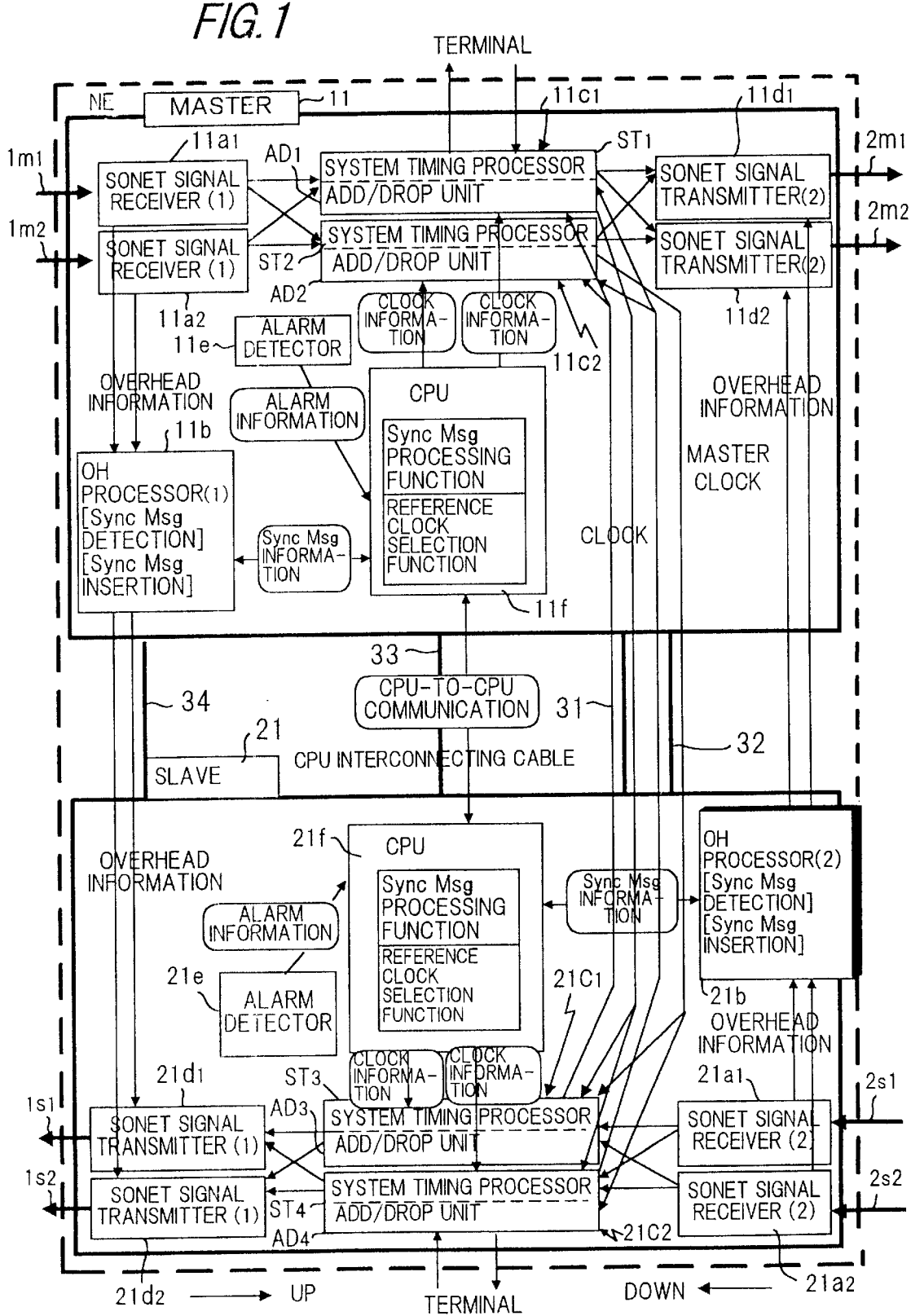
FIG. 1 is a diagram illustrating the overall construction of a transmission apparatus to which the present invention can be applied.

The master shelf 11 and slave shelf 21 are connected by two clock cables 31, 32, a processor interconnecting cable 33 and an interlink cable 34. The clock cables 31, 32 send clocks from the slave shelf 21 to the master shelf 11 and send master clocks from the master shelf 11 to the slave shelf 21. The processor interconnecting cable 33 sends and receives various data (synchronization status messages Sync Msg, fault occurrence alarm signals, etc.) between the CPUs of the master shelf 11 and slave shelf 21. The interlink cable 34 sends and receives overhead information (synchronization status messages) between the master shelf 11 and slave shelf 21.

(b) Master Shelf

The master shelf 11 includes SONET signal receivers $11a_1$, $11a_2$ having optoelectric converters for converting optical signals (main signals) that have entered from the lines $1m_1$, $1m_2$ to electric signals, and overhead extraction units for extracting overhead from the main signals (SONET signals), and an overhead processor 11b for (1) detecting synchronization status messages (Sync Msg) from the overhead S1 bytes of the main signals that have entered from the lines $1m_1$, $1m_2$ and inputting the synchronization status messages to a CPU 11f, and (2) inserting overhead, which includes a synchronization status message specified by the CPU 11f, into main signals sent from the slave shelf 21 to the lines $1s_1$~$1s_2$.

The master shelf 11 further includes signal processors $11c_1$, $11c_2$ respectively having system timing processors $ST_1$, $ST_2$ and ADD/DROP units $AD_1$, $AD_2$. The system timing processors $ST_1$, $ST_2$ (1) extract clocks from the main signals, (2) receive clocks from the slave shelf 21 via the clock cables 31, 32 and (3) send prescribed clocks as master signals to the slave shelf 21 via the clock cables 31, 32. The ADD/DROP units $AD_1$, $AD_2$ (1) extract (drop) data from a prescribed time slot of the time-division multiplexed main signals and input the data to a terminal device (not shown), and (2) insert (add) data that has entered from the terminal device into a prescribed time slot and then output the same.

SONET signal transmitters $11d_1$, $11d_2$ have overhead insertion units for inserting, into main signals, overhead (inclusive of a synchronization status message) specified by an overhead processor in the slave shelf 21, and electro-optic converters for converting electric signals (main signals) to optical signals and sending the optical signals to the lines $2m_1$, $2m_2$. An alarm detector 11e detects the occurrence of a fault in the system timing processors $ST_1$, $ST_2$ and the occurrence of a fault in the clock cables and notifies the CPU 11f. The latter controls the overall master shelf and implements functions related to the present invention, namely a synchronization status message processing function and a reference clock selection function, etc. The synchronization status message processing function includes (1) a function for deciding a master clock by referring to the quality levels of synchronization status messages, and (2) a function for deciding a synchronization status message to be inserted into a main signal sent from the slave shelf. The reference clock selection function is a function for selecting an HO clock or INT clock as the reference clock during execution of processing for deciding the master clock.

(c) Slave Shelf

The slave shelf 21 includes SONET signal receivers $21a_1$, $21a_2$ having optoelectric converters for converting optical signals (main signals) that have entered from the lines $2s_1$, $2s_2$ to electric signals, and overhead extraction units for extracting overhead from the main signals (SONET signals), and an overhead processor 21b for (1) detecting synchronization status messages from the overhead S1 bytes of the main signals that have entered from the lines $2s_1$, $2s_2$ and inputting the synchronization status messages to a CPU 21f, and (2) inserting a synchronization status message specified by the CPU 21f, into main signals sent from the master shelf 11 to the lines $2m_1$~$2m_2$.

The slave shelf 21 further includes signal processors $21c_1$, $21c_2$ respectively having system timing processors $ST_3$, $ST_4$ and ADD/DROP units $AD_3$, $AD_4$. The system timing processors $ST_3$, $ST_4$ (1) extract clocks from the main signals, (2) transmit clocks to the system timing processors ST1, ST2 of the master shelf 11 via the clock cables 31, 32 and (3) receive master clocks from the master shelf 11 via the clock cables 31, 32 and input the master clock to various units. The ADD/DROP units $AD_3$, $AD_4$ (1) extract (drop) data from a prescribed time slot of the time-division multiplexed main signals and input the data to a terminal device (not shown), and (2) insert (add) data that has entered from the terminal device into a prescribed time slot and then output the same.

SONET signal transmitters $21d_1$, $21d_2$ have overhead insertion units for inserting, into main signals, overhead (inclusive of a synchronization status message) specified by the overhead processor in the master shelf 11, and electro-optic converters for converting electric signals (main signals) to optical signals and sending the optical signals to the lines $1s_1$, $1s_2$. An alarm detector 21e detects the occurrence of a fault in the system timing processors ST3, ST4 and the occurrence of a fault in the clock cables and notifies the CPU 21f. The latter controls the overall slave shelf and implements a synchronization status message processing function and a reference clock selection function, etc. The synchronization status message processing function includes (1) a function for identifying the quality level of a synchronization status message that has been inserted into a main signal and notifying the master shelf via the CPU interconnecting cable 31, and (2) a function for creating a synchronization status message inserted into a main signal sent from the master shelf. The reference clock selection function includes (1) a function for selecting an HO clock or INT clock as the reference clock during execution of processing for deciding the master clock, and (2) a function for selecting the HO clock or INT clock as the reference clock when arrival of the master clock ceases owing to clock cable failure.

(d) Alternative Arrangements of Transmission Apparatus Having Plural Shelves

Figure 2A:
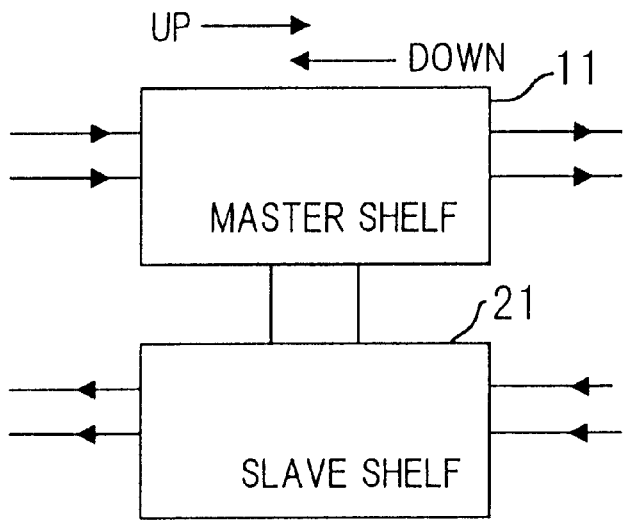
FIGS. 2A–2C are diagram showing arrangements of transmission apparatus having plural shelves.
Figure 2B:
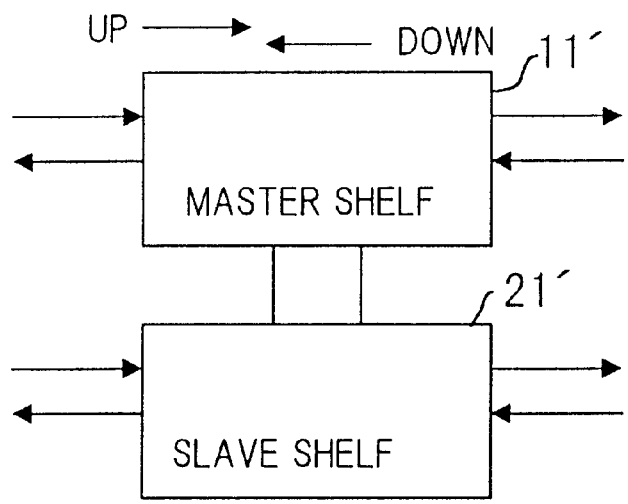
Figure 2C:
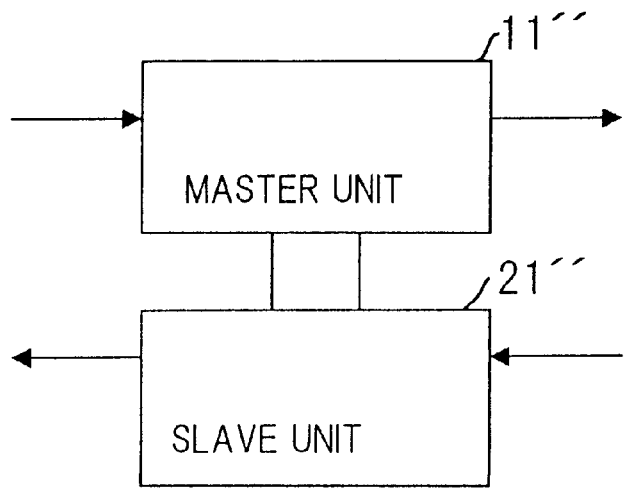

The transmission apparatus shown in FIG. 1 is depicted as shown in FIG. 2A. A transmission apparatus having a plurality of shelves is not limited to the arrangement of FIG. 2A but can have arrangements of the kind shown in FIGS. 2B and 2C. More specifically, in the arrangement of the transmission apparatus shown in FIG. 2B, a total of two signals enter each of master and slave shelves 11', 21', respectively, from UP and DOWN directions, the signals are subjected to predetermined processing in each shelf and are output from each shelf in UP and DOWN directions. In the arrangement of the transmission apparatus shown in FIG. 2C, one signal enters each of master and slave shelves 11", 21", respectively, from the UP or DOWN direction, the signal is subjected to predetermined processing in each shelf and is output from each shelf in the UP or DOWN direction.

Though only one slave shelf is shown in the foregoing arrangement, a transmission apparatus having two or more slave shelves is possible.

(e) Simplified Representation

Figure 3:
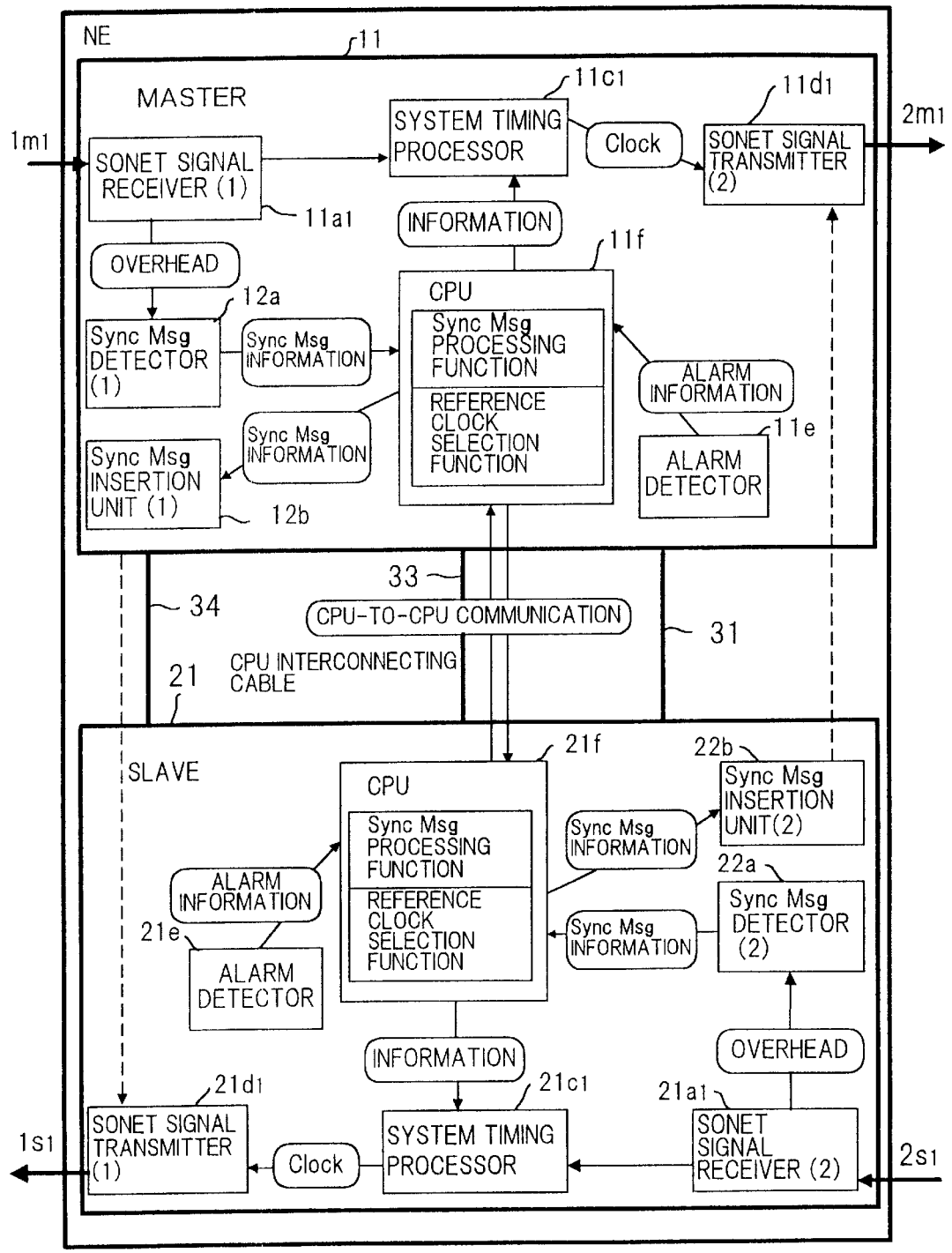
FIG. 3 is a diagram showing the construction of a transmission apparatus when a master shelf and slave shelf have a single-line configuration.

The master shelf 11 and slave shelf 21 shown in FIG. 1 each have a two-line configuration, which results in an overly complicated diagrammatic representation. Accordingly, in the description rendered below, the apparatus will be described by adopting a single-line configuration for both the master shelf 11 and slave shelf 21, as shown in FIG. 3, and splitting the overhead processor 11$b$ into a synchronization status message detector 12$a$ and synchronization status message insertion unit 12$b$ and the overhead processor 21$b$ into a synchronization status message detector 22$a$ and synchronization status message insertion unit 22$b$. Elements in FIG. 3 identical with those shown in FIG. 1 are designated by like reference characters.

Figure 4:
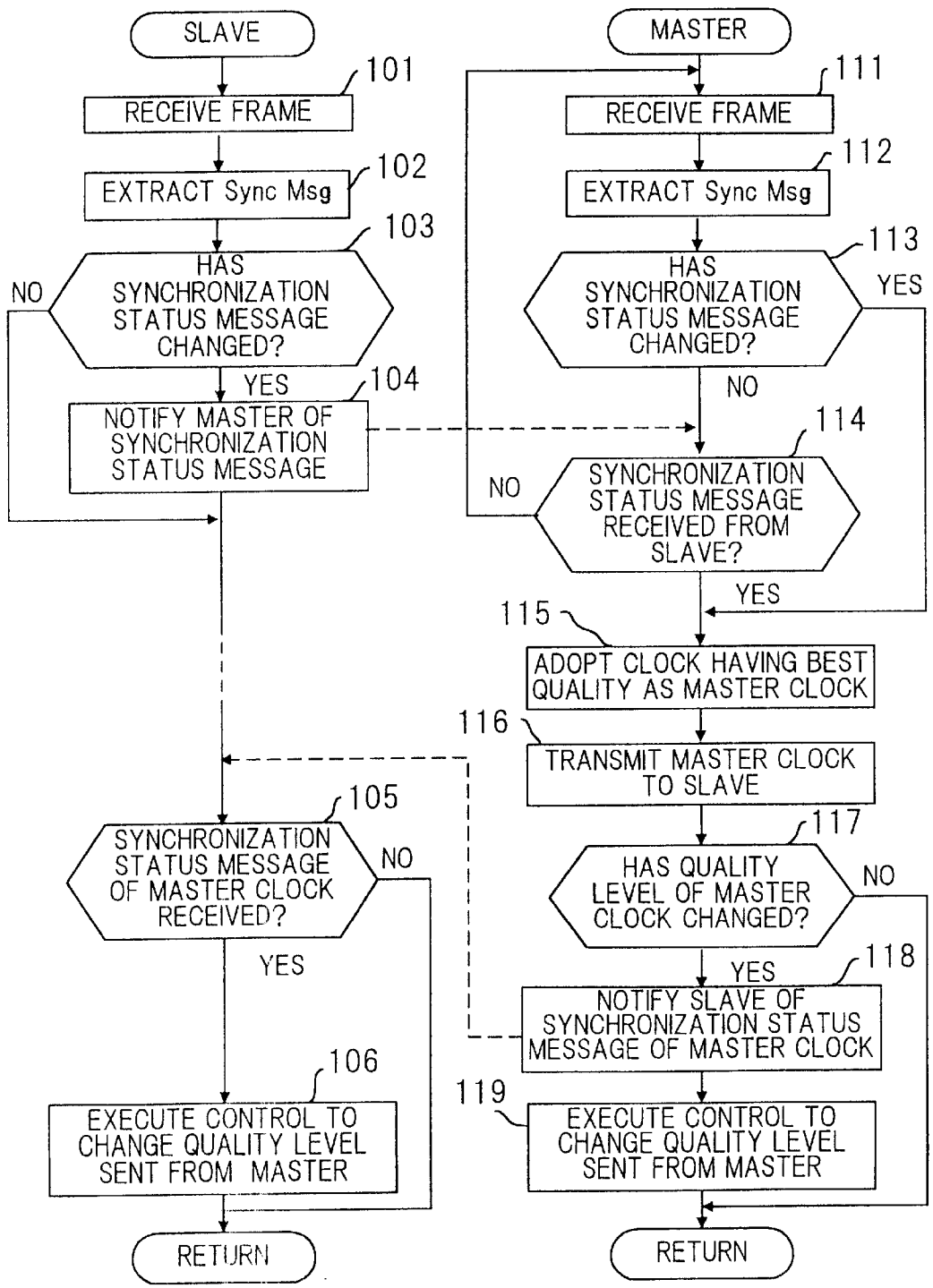
FIG. 4 is flowchart of processing for deciding a master clock and inserting a synchronization status message.

(B) Processing for Deciding Master Clock and Inserting Synchronization Status Message FIG. 4 is flowchart of processing for deciding a master clock and inserting a synchronization status message.

Upon receiving a SONET frame signal from the line 2$s_1$, the SONET signal receiver 21$a_1$ of the slave shelf 21 detects the overhead and inputs the overhead to the synchronization status message detector 22$a$ (step 101). The synchronization status message detector 22$a$ extracts the synchronization status message from the overhead and inputs the message to the processor 21$f$ (step 102). The processor 21$f$ checks to determine whether the entered synchronization status message is different from that received thus far (step 103). If the synchronization status message is different, the processor 21$f$ notifies the processor 11$f$ of the master shelf 11 of the new synchronization status message via the CPU interconnecting cable 33 (step 104).

It should be noted that the system timing processor 21$c_1$ sends a clock, which has been extracted from the SONET frame signal, to the system timing processor 11$c_1$ of the master shelf 11 via the clock cable 31. Further, the system timing processor 11$c_1$ sends a master clock to the system timing processor 21$c_1$ of the slave shelf 21 via the clock cable 31.

Thereafter, the processor 21$f$ checks to determine whether a synchronization status message indicating the quality of the master clock has been received from the processor 11$f$ of the master shelf 11 via the CPU interconnecting cable 33 within a prescribed period of time (step 105). That is, the processor 21$f$ checks to see whether the master clock has been switched over and whether the quality value has changed.

If a synchronization status message indicating the quality of the master clock is not received upon passage of a prescribed period of time, the processor 21$f$ construes that a changeover of the master clock has not taken place and, hence, the program returns to the beginning. However, if a synchronization status message indicating the quality of the master clock is received within the prescribed period of time, the processor 21$f$ construes that a changeover of the master clock has taken place and therefore inputs the received synchronization status message to the synchronization status message insertion unit 22$b$. The synchronization status message insertion unit 22$b$ sets the entered synchronization status message in the S1 byte of the overhead and then sends the overhead to the SONET signal transmitter 11$d_1$ via the interlink cable 34. The SONET signal transmitter 11$d_1$ uses the data that enters from the system timing processor 11$c_1$ and the overhead that enters from the slave shelf 21 to assemble a SONET frame signal, and sends this signal to the line 2$m_1$ (step 106).

If the SONET frame signal is received from the line 1$m_1$, the SONET signal receiver 11$a_1$ of the master shelf 11 extracts the overhead and inputs the overhead to the synchronization status message detector 12$a$ (step 111). The synchronization status message detector 12$a$ extracts the synchronization status message from the overhead and inputs the message to the processor 11$f$ (step 112). The processor 11$f$ checks to determine whether the entered synchronization status message is different from that received thus far (step 113).

If the synchronization status message is not different, the processor 11$f$ checks to see whether a synchronization status message has been received from the processor 21$f$ of the slave shelf 21 via the CPU interconnecting cable 33 (step 114). It should be noted that if the quality level of the clock changes, the processor 21$f$ in the slave shelf 21 notifies the processor 11$f$ of the synchronization status message indicating this quality level at step 104.

If it is found at step 114 that the synchronization status message has not been received from the processor 21$f$, there is no need to change over the master clock, processing returns to step 111 and is repeated from this step onward.

If it is found at step 113 that the synchronization status message included in the SONET signal that has entered from the line 1$m_1$ is different from that received thus far, or if it is found at step 114 that the synchronization status message has been received from the processor 21$f$, then it is necessary to decide a master clock. Accordingly, the processor 11$f$ obtains the synchronization status message indicating the best quality from the synchronization status message acquired from the slave shelf 21 and the synchronization status message detected by the master shelf at step 112, and adopts, as the master clock, the clock extracted from the main signal into which this synchronization status message has been inserted (step 115). As a result, the system timing processor 11$c_1$ transmits the decided master clock to the system timing processor 21$c_1$ of the slave shelf 21 via the clock cable 31 (step 116).

Next, the processor 11$f$ checks to see whether the quality level of the master clock has changed from that of the master clock received thus far (step 117). If the quality level has not changed, the program returns and processing is repeated from the beginning. If the quality level of the master clock has changed, however, the processor 11$f$ notifies the processor 21$f$ of the slave shelf 21, via the CPU interconnecting cable 33, of the synchronization status message indicative of this quality level (step 118).

Next, the processor 11$f$ inputs the synchronization status message indicative of the quality level of the master clock to the synchronization status message insertion unit 12$b$. The latter sets the entered synchronization status message in the S1 byte of the overhead and sends the overhead to the SONET signal transmitter 21$d_1$ via the interlink cable 34.

The SONET signal transmitter $21d_1$ uses the data that enters from the system timing processor $21c_1$ and the overhead that enters from the slave shelf 11 to assemble a SONET frame signal, and sends this signal to the line $1s_1$ (step 119).

Figure 5:
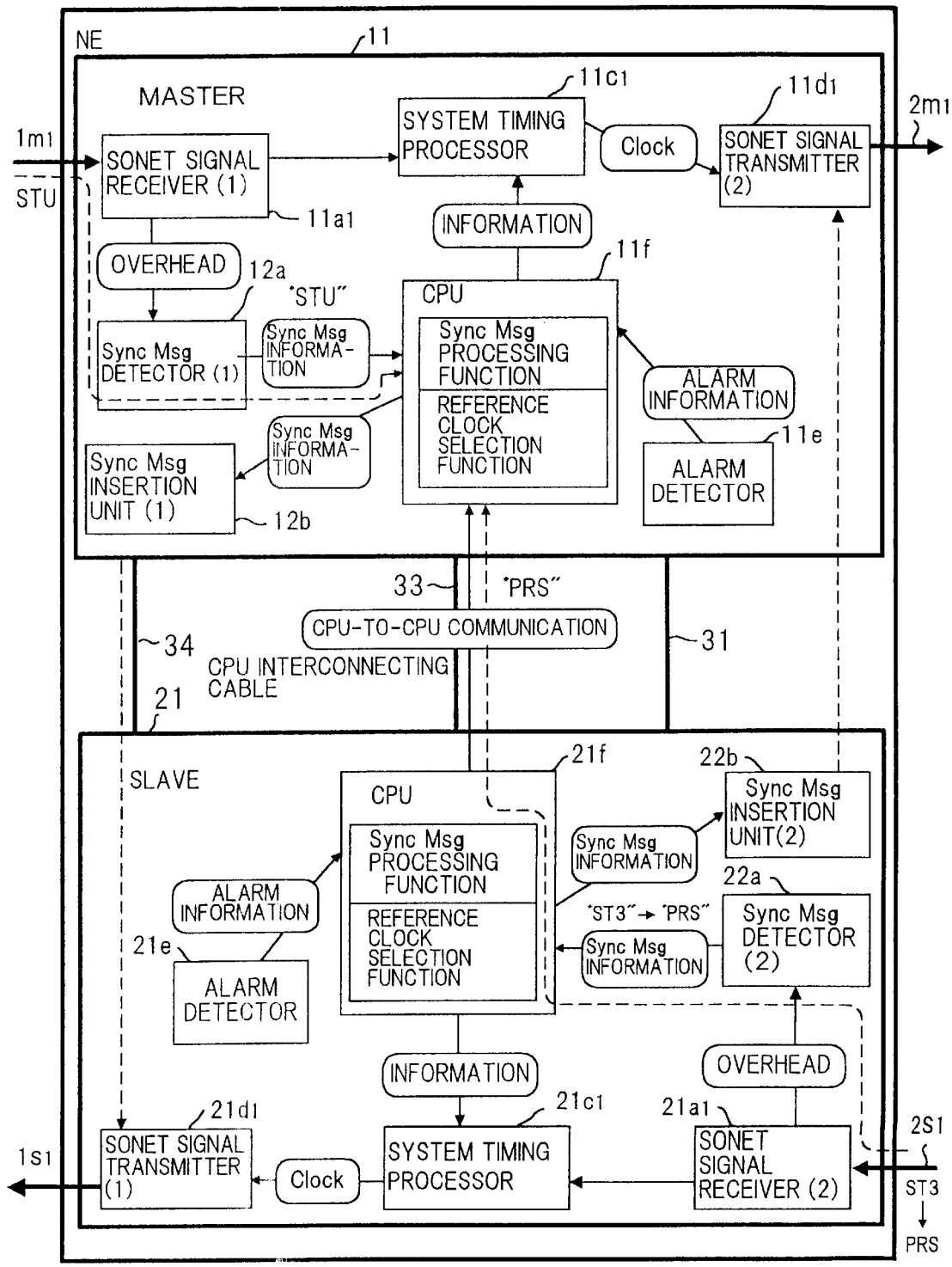
FIG. 5 is a diagram useful in describing the path of a synchronization status message when a master clock is decided.
Figure 6:
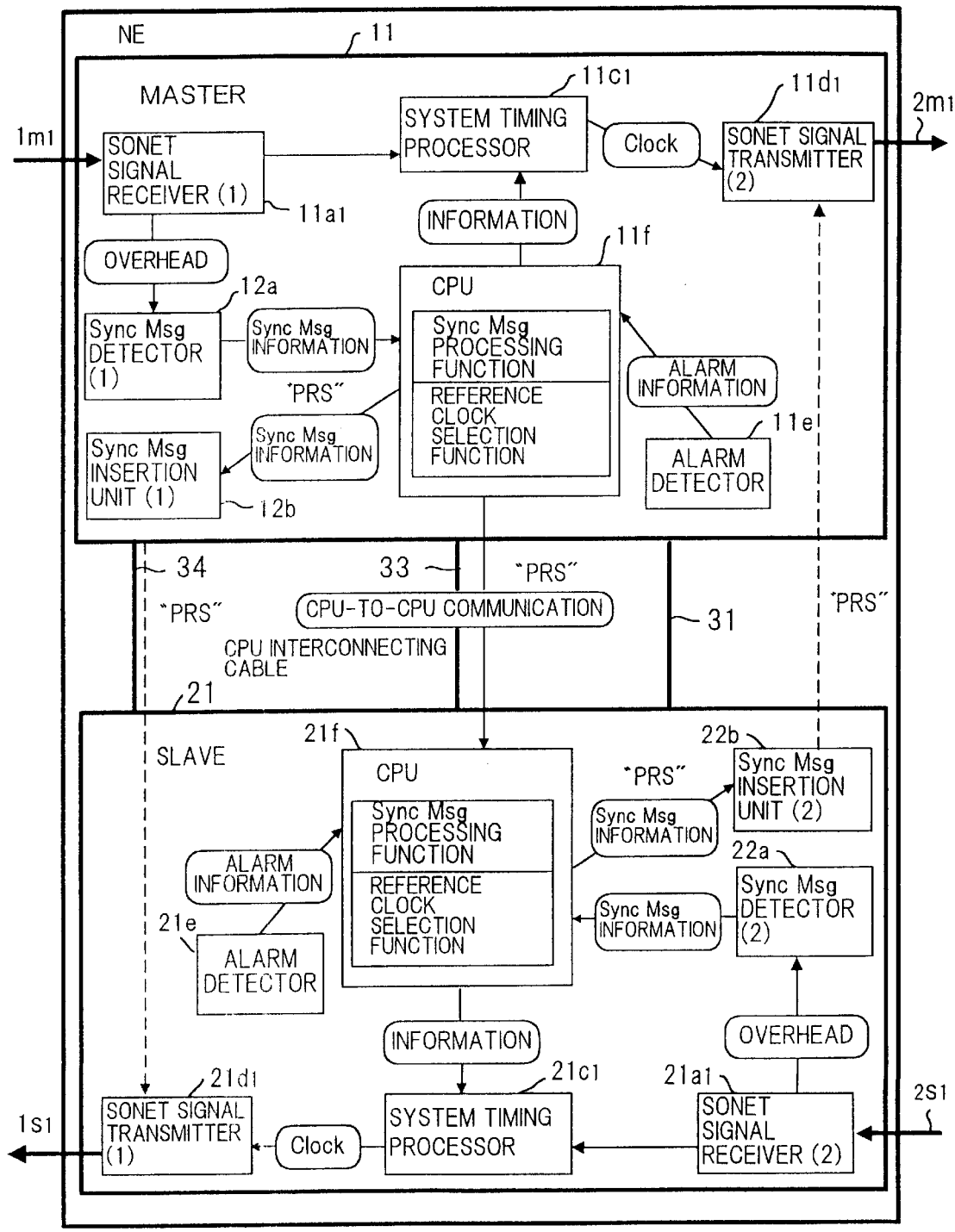
FIG. 6 is a diagram useful in describing the path of a synchronization status message when the synchronization status message is inserted into a SONET signal.

FIG. 5 is a diagram useful in describing the path of a synchronization status message when a master clock is decided, and FIG. 6 is a diagram useful in describing the path of a synchronization status message when the synchronization status message is inserted into a SONET signal.

When the synchronization status message of the SONET signal that enters from the line $1m_1$ is STU (quality level=2) and the synchronization status message of the SONET signal that enters from the line $2s_1$ is ST3 (quality level=4), the clock extracted from the SONET signal that enters from the line $1m_1$ is the master clock, as shown in FIG. 5. If the synchronization status message of the SONET signal that enters from the line $2s_1$ changes from ST3 to PRS (quality level=1) under these conditions, the processor $21f$ informs the processor $11f$ of the master shelf 11, via communication between the CPUs, that the synchronization status message has changed to PRS. The processor $11f$ compares the quality level of STU, which is the received synchronization status message of its own shelf, and the quality level of PRS, which is the received synchronization status message of the slave shelf, and selects, as the master clock, the clock extracted from the SONET signal into which the synchronization status message PRS, which has the higher quality level, has been inserted. In this case, the clock extracted from the SONET signal that has entered from the line $2s_1$ becomes the master clock.

As a result, the synchronization status message inserted into the SONET signals sent from the lines $2m_1$ and $1s_1$ is required to be made PRS. Accordingly, as shown in FIG. 6, the processor $11f$ controls the synchronization status message insertion unit $12b$ in such a manner that the synchronization status message of the SONET signal sent from the line $1s_1$ becomes PRS, and sets PRS in the overhead (S1 byte) of this SONET signal. Further, the processor $11f$ informs the processor $21f$ of the slave shelf 21, via the CPU interconnecting cable 33, of the synchronization status message "PRS" that conforms to the quality level of the master clock. In accordance with this notification, the processor $21f$ controls the synchronization status message insertion unit $22b$ in such a manner that the synchronization status message of the SONET signal sent from the line $2m_1$ becomes PRS, and sets PRS in the overhead (S1 byte) of this SONET signal.

Figure 7:
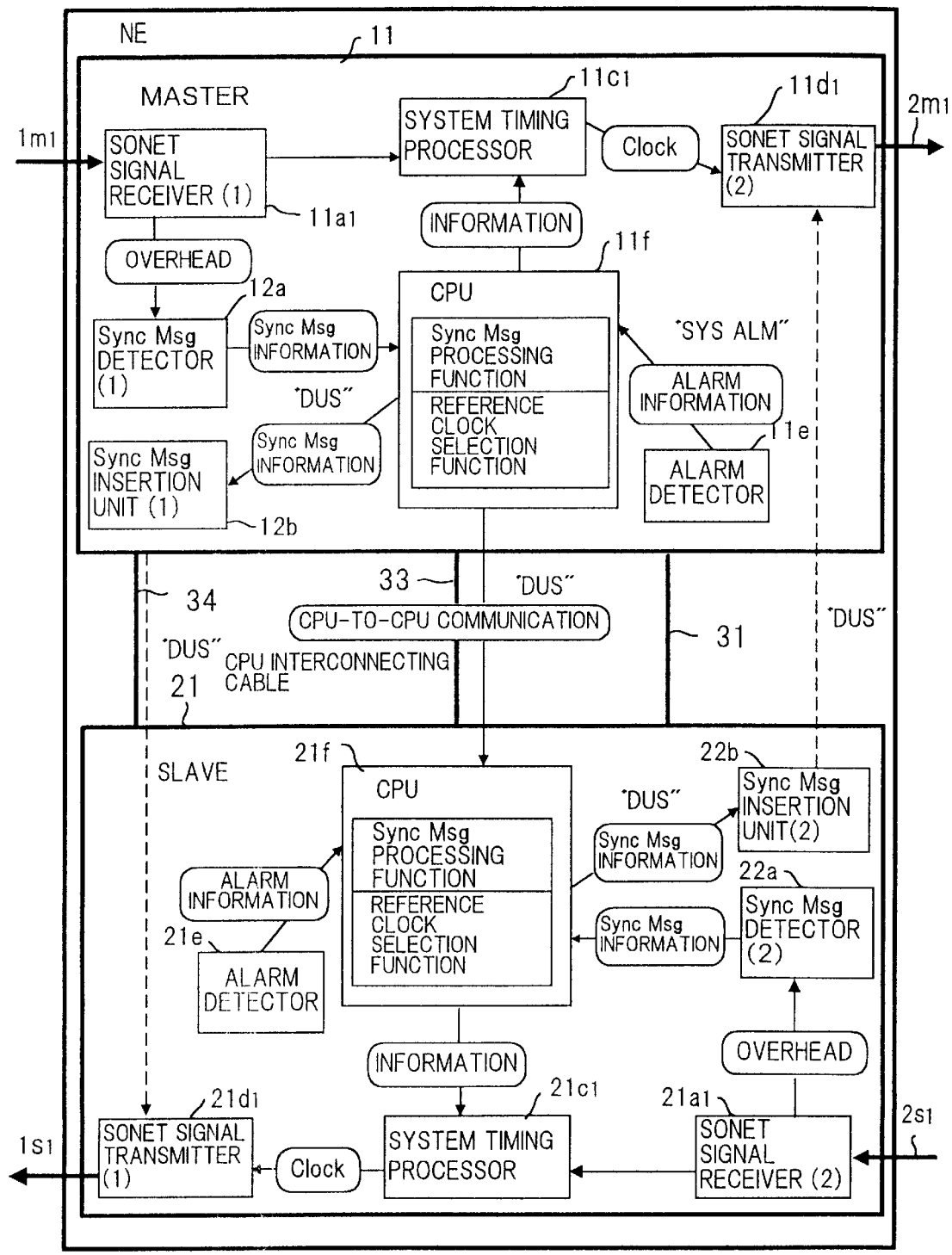
FIG. 7 is a diagram useful in describing processing in a case where a fault has developed in a system timing processor of the master shelf.

(C) Processing When at Occurrence of Fault in System Timing Processor (a) When Fault Occurs in System Timing Processor of Master Shelf FIG. 7 is a diagram useful in describing processing in a case where a fault has developed in the system timing processor $11c_1$ of the master shelf 11.

When a fault occurs in the system timing processor $11c_1$ of the master shelf 11, it is necessary to so arrange it that the master clock of this apparatus will not be used as the master clock of another transmission apparatus connected to the network. To accomplish this, the synchronization status messages to be inserted into the SONET signals sent from the faulty apparatus must all be made DUS.

When the alarm detector $11e$ detects the occurrence of a fault in the system timing processor $11c_1$, the detector $11e$ inputs an alarm signal SYS ALM to the processor $11f$ of the master shelf 11. In response to entry of the alarm signal, the processor $11f$ controls the synchronization status message insertion unit $12b$ in such a manner that the synchronization status message of the SONET signal sent from the line $1s_1$ becomes DUS, and sets DUS in the overhead (S1 byte) of this SONET signal.

Further, control of the synchronization status message of the SONET signal sent to the line $2m_1$ from the master shelf 11 is performed by the slave shelf 21. To accomplish this, the processor $11f$ informs the processor $21f$ of the slave shelf 21, via communication between the CPUs, of the synchronization status message "DUS" of this SONET signal. Upon receiving the synchronization status message "DUS" of the SONET signal, the processor $21f$ controls the synchronization status message insertion unit $22b$ in such a manner that the synchronization status message of the SONET signal sent from the line $2m_1$ becomes DUS, and sets DUS in the overhead (S1 byte) of this SONET signal.

(b) When Fault Occurs in System Timing Processor of Slave Shelf

Figure 8:
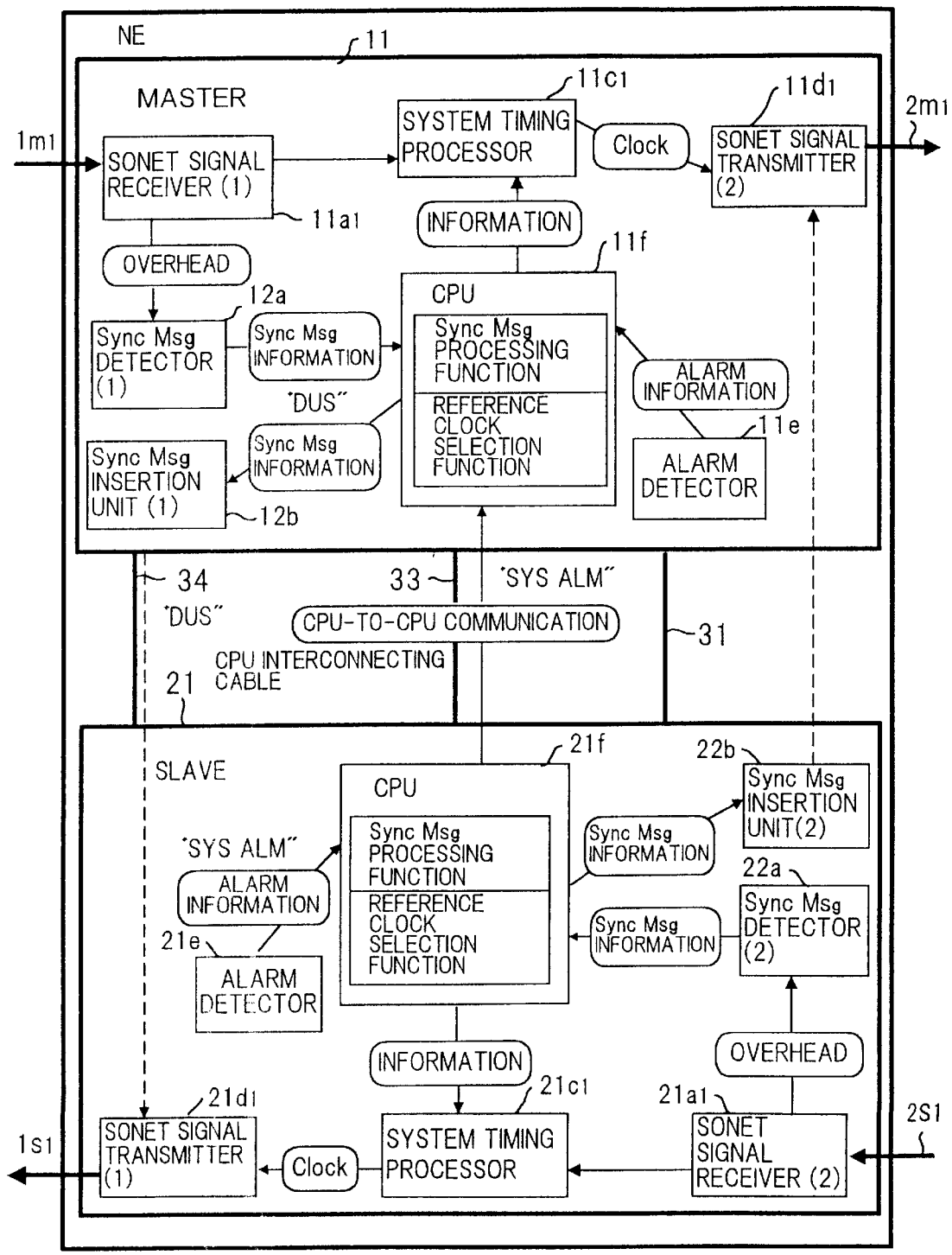
FIG. 8 is a diagram useful in describing processing in a case where a fault has developed in a system timing processor of a slave shelf.

FIG. 8 is a diagram useful in describing processing in a case where a fault has developed in the system timing processor $21c_1$ of the slave shelf 21.

When a fault occurs in the system timing processor $21c_1$ of the slave shelf 21, it is necessary to so arrange it that the clock included in the SONET signal sent from the slave shelf 21 will not be used as the master clock of another transmission apparatus connected to the network.

When the alarm detector $21e$ detects the occurrence of a fault in the system timing processor $21c_1$, the detector $21e$ inputs an alarm signal SYS ALM to the processor $21f$ of the master shelf 21. In response to entry of the alarm signal, the processor $21f$ notifies the processor $11f$ of the master shelf, via communication between the CPUs, of the fact that a fault has occurred in the system timing processor $21c_1$. In response to notification, the processor $11f$ of the master shelf controls the synchronization status message insertion unit $12b$ in such a manner that the synchronization status message of the SONET signal sent from the slave shelf 21 to the line $1s_1$ becomes DUS, and sets DUS in the overhead (S1 byte) of this SONET signal.

(c) Flow of Processing

Figure 9:
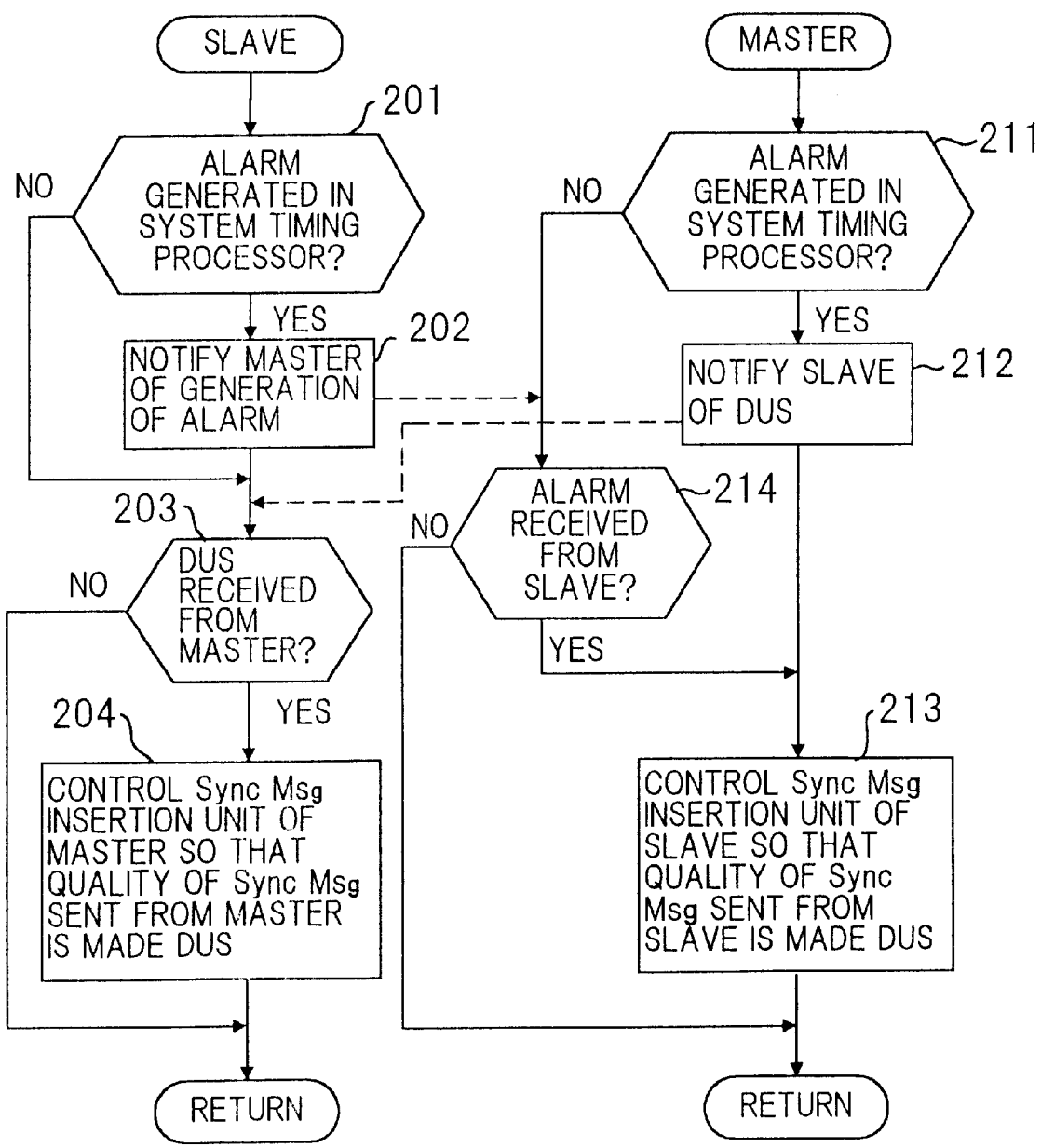
FIG. 9 is a flowchart of processing executed when a fault has developed in a system timing processor.

FIG. 9 is a flowchart of processing executed when a fault has developed in the system timing processors $11c_1$, $21c_1$ of the master and slave shelves.

The alarm detector $21e$ of the slave shelf 21 checks to determine whether a fault has occurred in the system timing processor $21c_1$ (step 201). If occurrence of a fault is detected, the alarm detector $21e$ inputs the alarm signal SYS ALM to the processor $21f$ and the processor $21f$ notifies the processor $11f$, via the CPU interconnecting cable 33, of the occurrence of the fault in the system timing processor $21c_1$ (step 202). Thereafter, or in a case where it is found at step 201 that the system timing processor $21c_1$ has not malfunctioned, the processor $21f$ checks to see whether the synchronization status message "DUS" of the SONET signal is being received from the processor $11f$ of the master shelf via the CPU interconnecting cable 33 (step 203).

If the synchronization status message "DUS" is not being received, the program returns to the beginning and processing is repeated. If the synchronization status message "DUS" of the SONET signal has been received, however, the processor $21f$ controls the synchronization status message insertion unit $22b$ in such a manner that the synchronization status message of the SONET signal sent from the master shelf 11 to the line $2m_1$ becomes DUS, and sets DUS in the overhead (S1 byte) of this SONET signal (step 204). The program then returns to the beginning and processing is repeated.

The alarm detector $11e$ of the maser shelf 11 checks to determine whether a fault has occurred in the system timing processor $11c_1$ (step 211). If occurrence of a fault is detected, the alarm detector 11e inputs the alarm signal SYS ALM to the processor 11f and the processor 11f sends the synchronization status message "DUS" of the SONET signal to the processor 21f via the CPU interconnecting cable 33 (step 212). As a result, the processor 21f executes the processing of step 204 and sets DUS in the overhead (Si byte) of the SONET signal sent from the master shelf 11 to the line $2m_1$.

After executing the processing of step 212, the processor 11f controls the synchronization status message insertion unit 12b in such a manner that the synchronization status message of the SONET signal sent from the slave shelf 21 to the line $1s_1$ becomes DUS, and sets DUS in the overhead (S1 byte) of this SONET signal (step 213). Thus, by virtue of steps 211 through 213, when a fault develops in the system timing processor $11c_1$ of the master shelf 11, the synchronization status messages of all SONET signals sent from the faulty transmission apparatus are made DUS.

If it is found at step 211 that a fault has not occurred in the system timing processor $11c_1$, then the processor 11f checks to see whether notification of the occurrence of a fault in the system timing processor $21c_1$ is being received from the processor 21f (step 214). If such notification is not being received, the program returns to the beginning and processing is repeated. If notification of the occurrence of a fault is being received, however, the processor 11f executes the processing of step 213. That is, the processor 11f controls the synchronization status message insertion unit 12b in such a manner that the synchronization status message of the SONET signal sent from the slave shelf 11 to the line $1s_1$ becomes DUS, and sets DUS in the overhead (S1 byte) of this SONET signal (step 204).

(D) Control when Fault Occurs in Clock Cable

Figure 10:
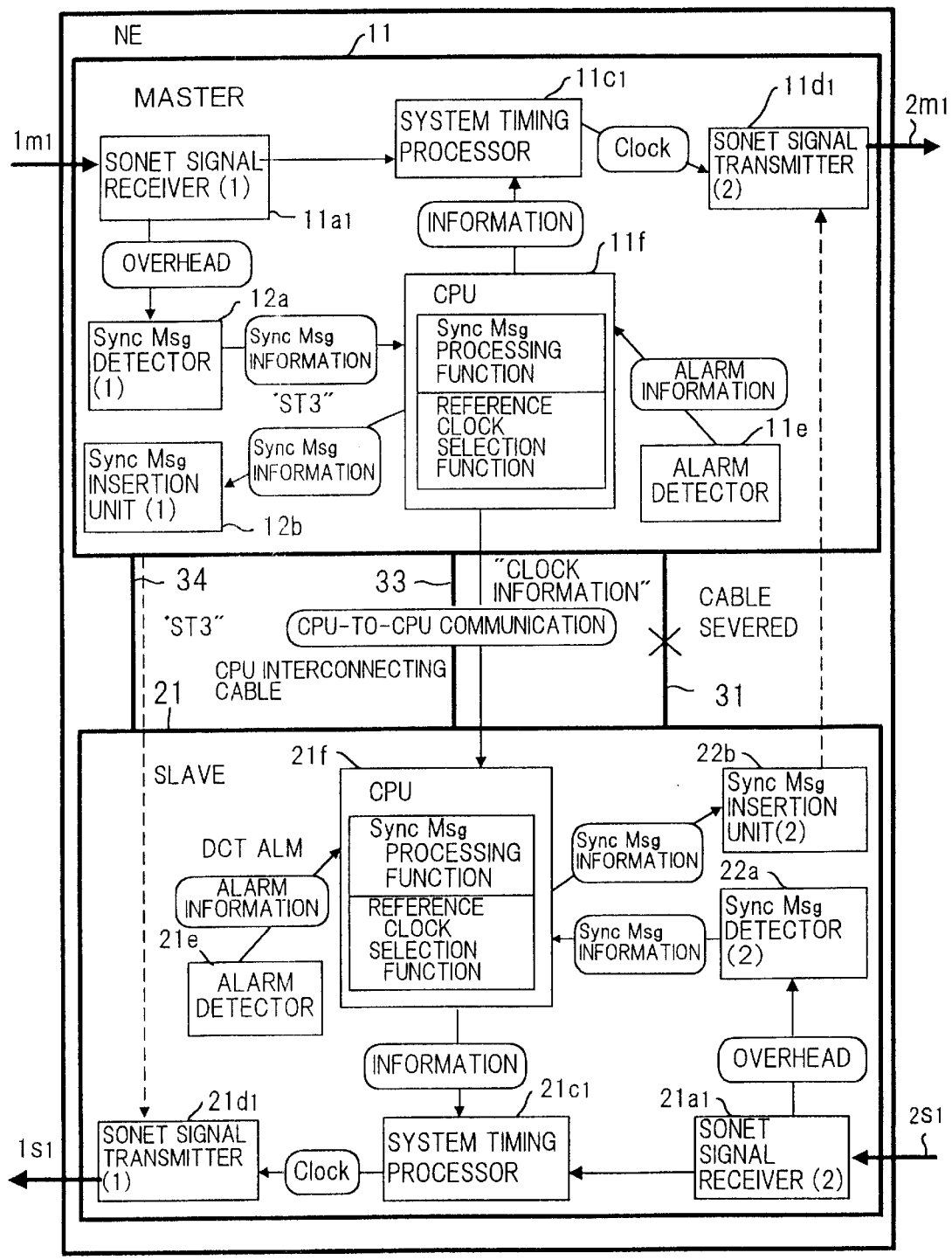
FIG. 10 is a diagram useful in describing processing executed when a fault has developed in a clock cable.
Figure 11:
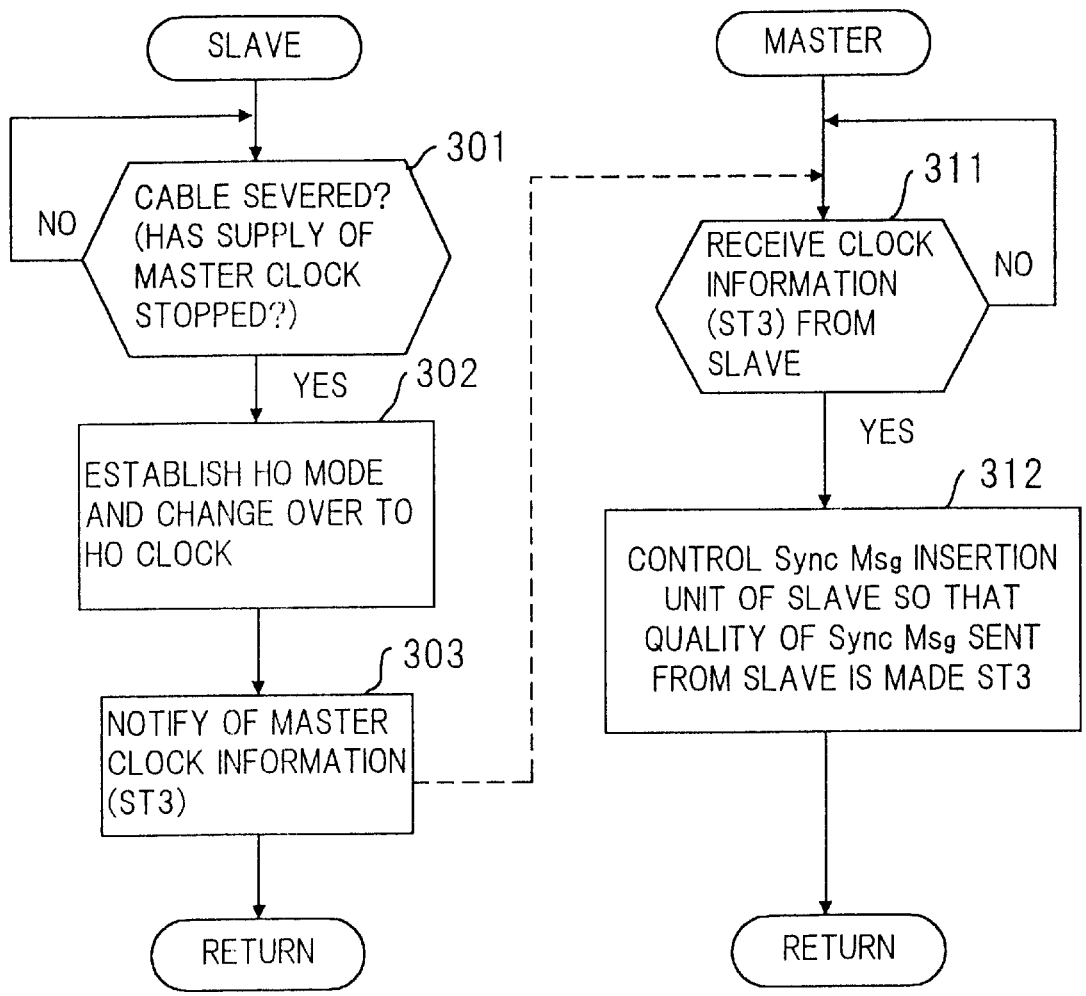
FIG. 11 is flowchart of processing executed when a fault has developed in a clock cable.

FIG. 10 is a diagram useful in describing processing executed when a fault has developed in the clock cable 31, and FIG. 11 is a flowchart of the associated processing.

If a fault has occurred in the clock cable 31, the slave shelf 21 stops being supplied with the clock from the master shelf 11 and therefore changes the clock over to the HO clock or INT clock (steps 301, 302). In such case the processor 11f of the master shelf 11 cannot detect the changeover to the HO clock or IN clock in the slave shelf 21. Accordingly, the processor 21f notifies the processor 11f of the reference clock information (inclusive of the quality level) via the CPU interconnecting cable 33 (step 303).

In response to such notification, the processor 11f recognizes that the reference clock has changed over to the HO clock or INT clock in the slave shelf 21 (step 311). Next, the processor 11f controls the synchronization status message insertion unit 12b so that the synchronization status message inserted into the SONET signal sent to the line $1s_1$ is made ST3 or ST4 (the synchronization status message of the HO clock is ST3 and that of the INT clock is ST4), and sets "ST3" or "ST4" in the overhead (S1 byte) of this SONET signal (step 312).

(E) Control During Processing which Decides Master Clock

When processing for deciding a master clock is being executed based upon the quality level of each clock, each shelf is unclear as to what should be used as the master clock. For this reason, during the short period of time over which processing is executed to decide the master clock, a self-timing clock such as the HO (holdover) clock or INT (internal) clock is used as the reference clock. If the synchronization status message indicating the quality level of the clock used is changed and transmitted to another transmission apparatus in the network whenever the clock used is changed, the changeover of the master clock in this other transmission apparatus will take place frequently, the overall network will be rendered unstable and network synchronization will be lost. Accordingly, it is so arranged that the synchronization status message is not changed in a case where a self-timing clock such as the HO (holdover) clock or INT (internal) clock is used as the reference clock during execution of processing for deciding the master clock.

Figure 12:
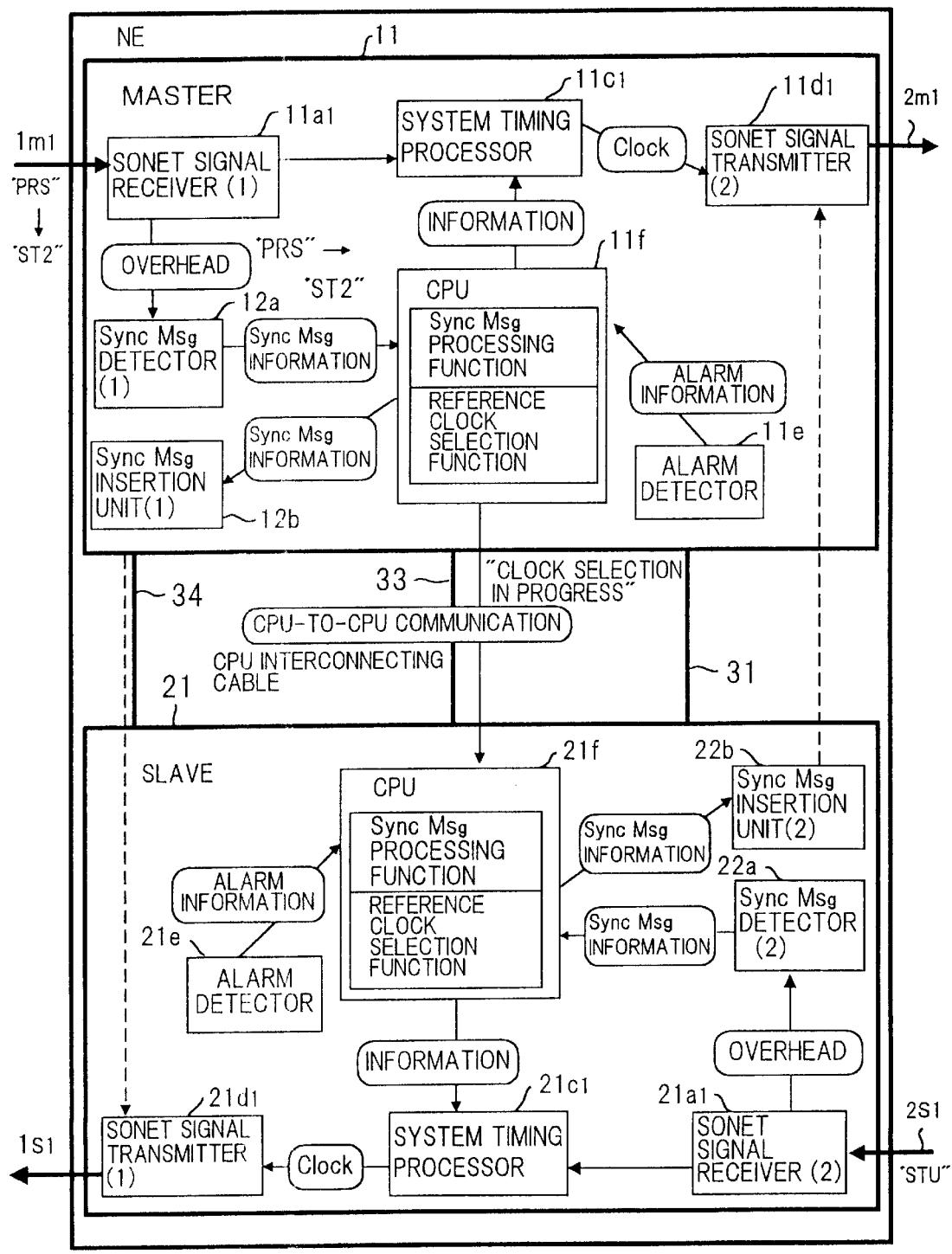
FIG. 12 is a diagram useful in describing control during selection of a master clock.
Figure 13:
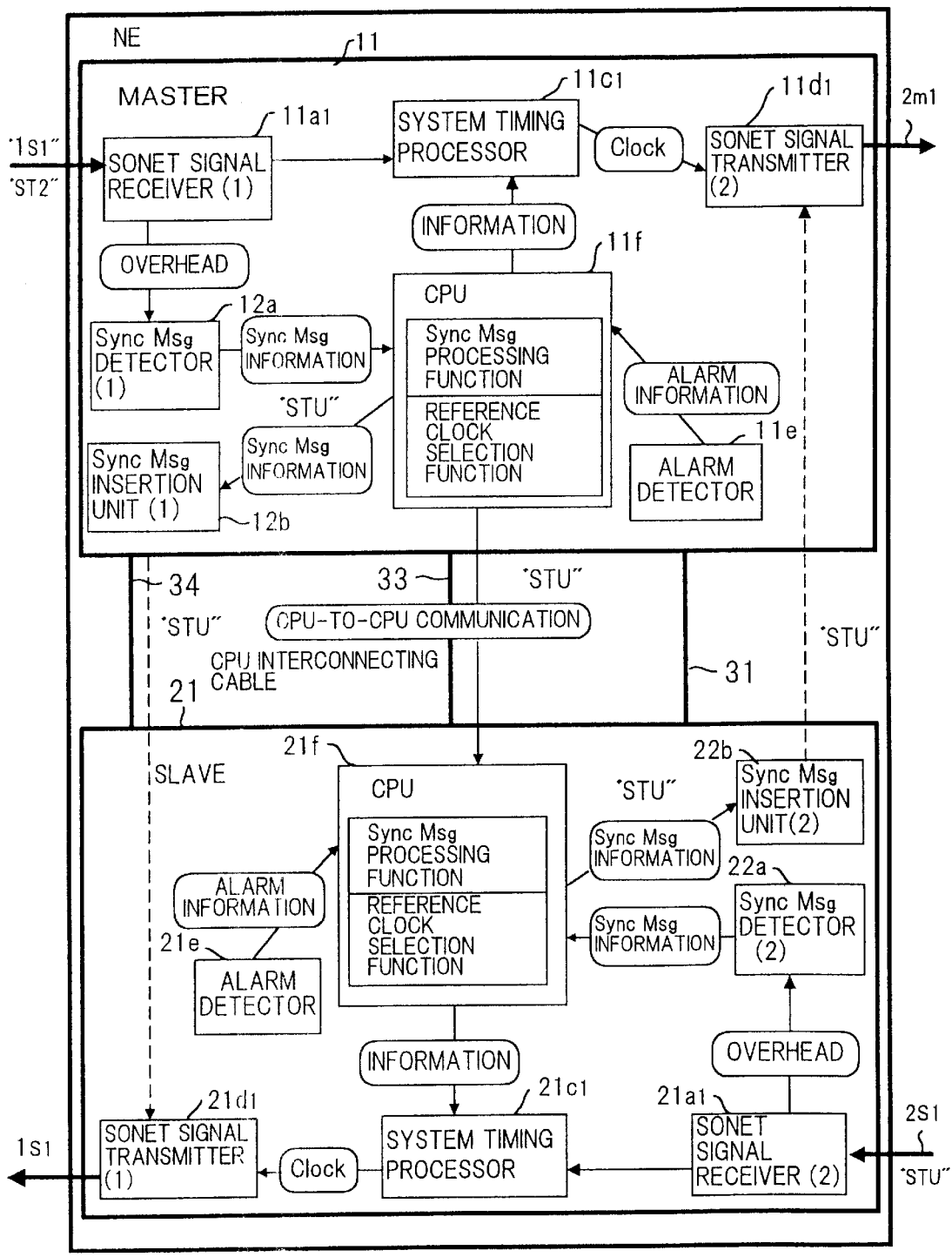
FIG. 13 is a diagram useful in describing control during selection of a master clock.

FIGS. 12 and 13 are diagrams useful in describing control during selection of a master clock.

When the synchronization status message of the SONET signal input from the line $1m_1$ to the master shelf 11 is PRS (quality level=1), the synchronization status message of the SONET signal input from the line $2s_1$ to the slave shelf 21 is STU (quality level=2) and the synchronization status message of the INT clock is ST3 (quality level=4), as shown in FIG. 12, the clock extracted from the SONET signal that enters from the line $1m_1$ is the master clock.

If the synchronization status message of the SONET signal that enters from the line $1m_1$ changes to ST2 (quality level=3) under these conditions, the master shelf 11 uses the INT (internal) clock as the reference clock. Further, the processor 11f of the master shelf 11 starts execution of processing to decide the master clock and notifies the processor 21f of "clock selection in progress" via the CPU interconnecting cable 33. Upon receiving notification of "clock selection in progress", the slave shelf 21 uses the INT (internal) clock as the reference clock. The synchronization status messages of the SONET signals sent from each of the shelves 11, 21 to the lines $2m_1$, $1s_1$ are not changed even in a case where the INT (internal) clock is used as the reference clock, as set forth above.

Thereafter, the processor 11f of the master shelf 11 ends the processing which decides the master clock. In this case, the block extracted from the SONET signal that enters from the line $2s_1$ becomes the master clock.

When the processor 11f ends the processing which decides the master clock, the processor 11f inputs the synchronization status message (STU) indicative of the quality level of the master clock to the processor 21f of the slave shelf 21 via the CPU interconnecting cable 33, as shown in FIG. 13. Further, the processor 11f of the master shelf controls the synchronization status message insertion unit 12b in such a manner that the synchronization status message of the SONET signal sent from the slave shelf 21 to the line $1s_1$ becomes STU, and sets STU in the overhead (S1 byte) of the SONET signal.

Upon receiving the synchronization status message "STU" of the SONET signal, the processor 21f of the slave shelf 21 controls the synchronization status message insertion unit 22b in such a manner that the synchronization status message of the SONET signal sent from the master shelf 11 to the line $2m_1$ becomes STU, and sets STU in the overhead (S1 byte) of this SONET signal.

(F) Modification

In the description rendered above, the transmission apparatus shown in FIG. 1 has such a construction that (1) overhead information of SONET signals sent from the master shelf 11 to the lines $2m_1$~$2m_2$ is created by the overhead processor 21b of the slave shelf 21 and inserted into the SONET signals, and (2) overhead information of SONET signals sent from the master shelf 21 to the lines $1s_1$~$1s_2$ is created by the overhead processor 11b of the slave shelf 11 and inserted into the above-mentioned SONET signals.

Figure 14:
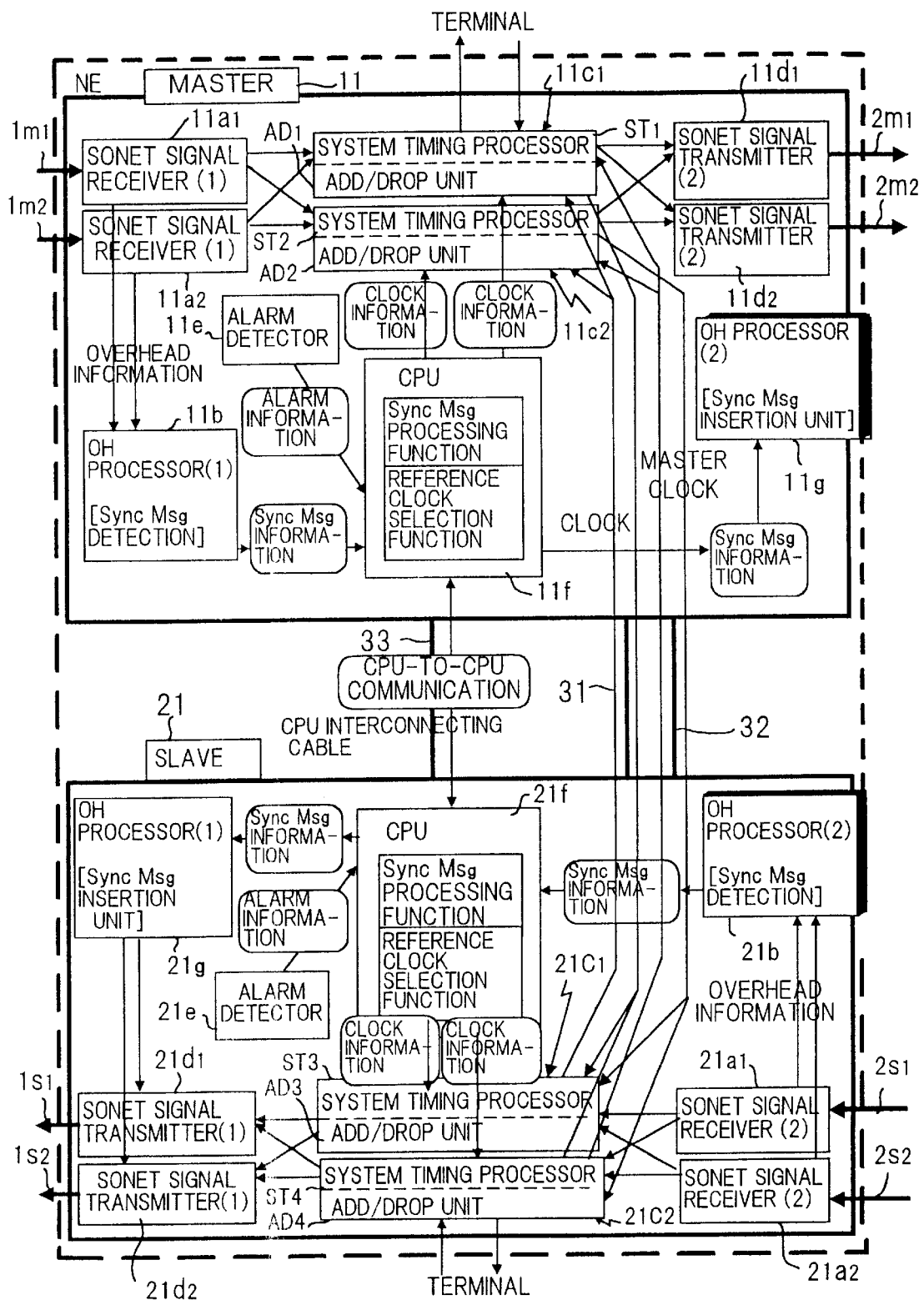
FIG. 14 is a diagram showing another construction of a transmission apparatus.
Figure 15:
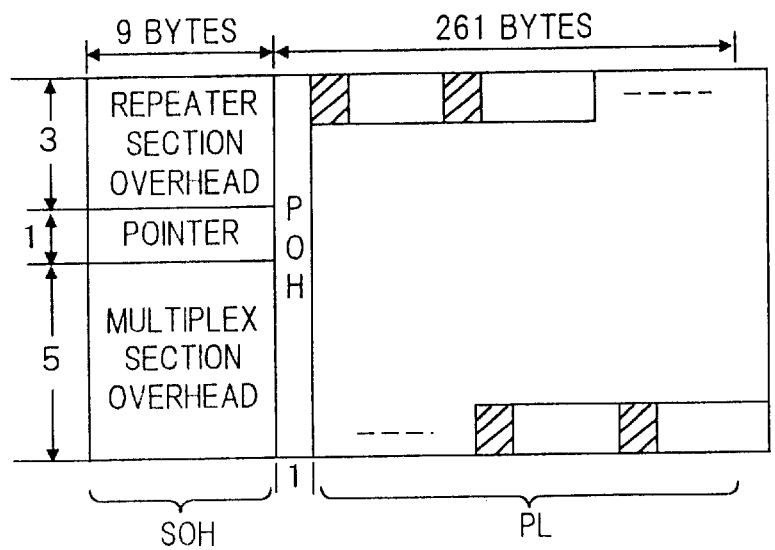
FIG. 15 is a diagram useful in describing the structure of a frame in accordance with the SONET standard according to the prior art.
Figure 16:
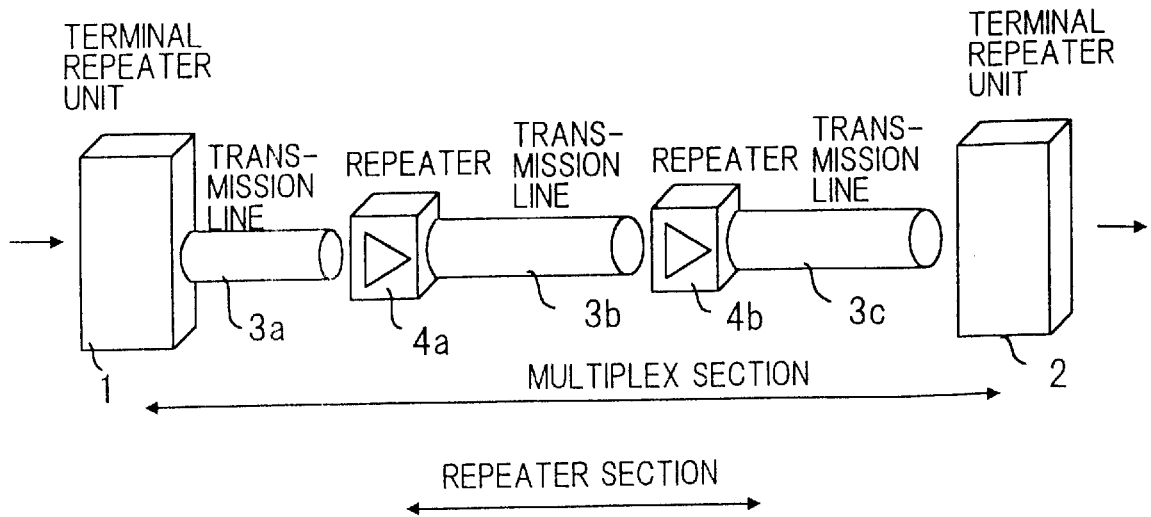
FIG. 16 is a diagram useful in describing a multiplex section and a repeater section according to the prior art.
Figure 20:
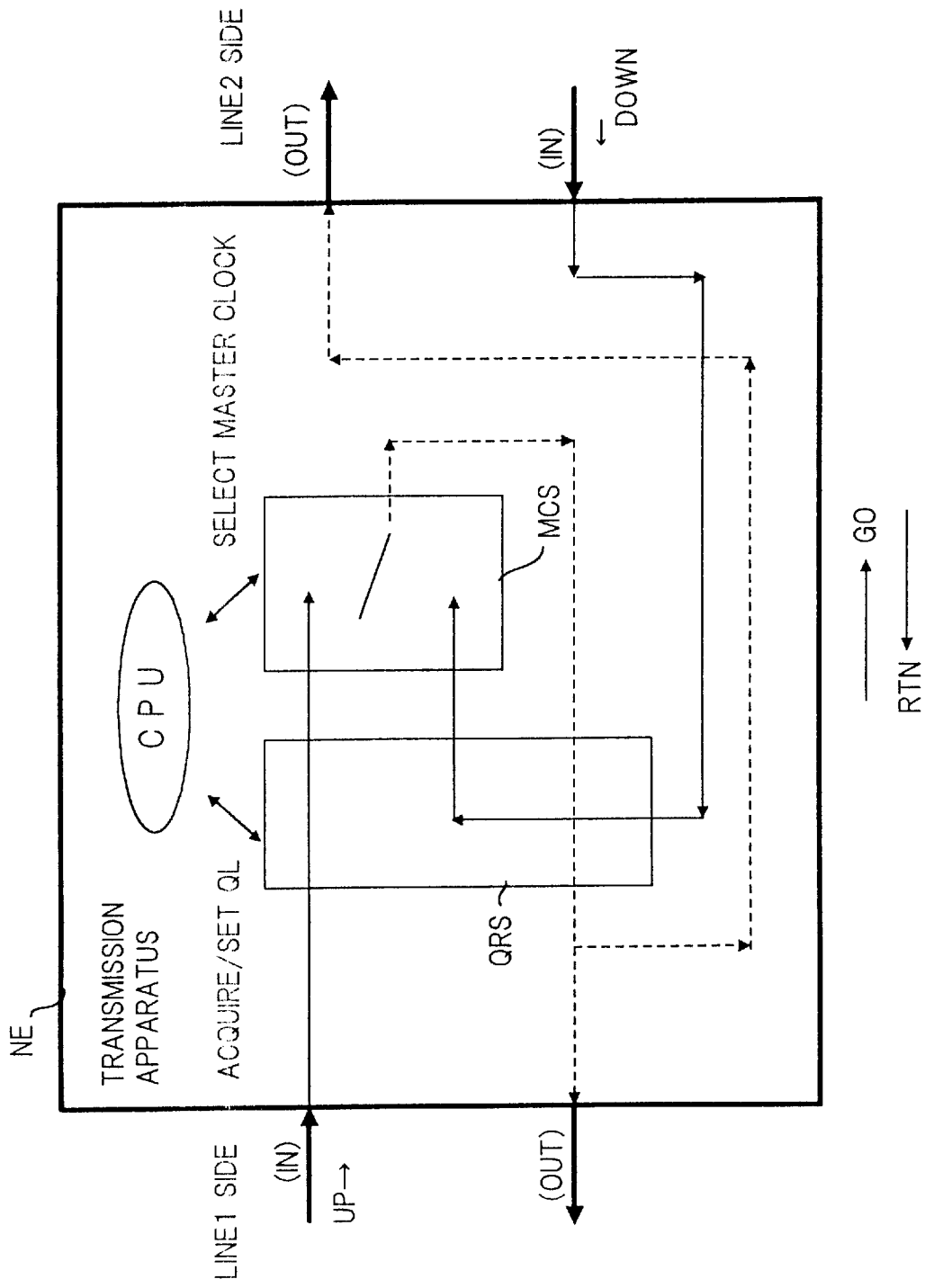
FIG. 20 is a diagram useful in describing the clock selecting operation of a transmission apparatus according to the prior art.

However, the transmission apparatus is not limited to the arrangement of FIG. 1 and the present invention is applicable also in a case where the transmission apparatus has the arrangement shown in FIG. 14. In the transmission apparatus shown in FIG. 14, (1) the master shelf 11 is provided with an overhead processor 11g and the slave shelf 21 is provided with an overhead processor 21g, (2) overhead information of SONET signals sent from the master shelf 11 to the lines $2m_1 \sim 2m_2$ is created by the overhead processor 11g and inserted into these SONET signals, and (3) overhead information of SONET signals sent from the slave shelf 21 to the lines $1s_1 \sim 1s_2$ is created by the overhead processor 21g and inserted into these SONET signals.

A case in which each shelf accommodates one line is described above in detail. However, even if each shelf accommodates a plurality of lines, control for deciding a master clock, control for creating and inserting synchronization status messages and control for selecting a reference clock can be carried out in the same manner as in the arrangement having one line per shelf.

In accordance with the invention, processing for detecting synchronization status messages can be distributed among the units (master and slave units) constituting a transmission apparatus. As a result, the master unit is capable of deciding a master clock merely by acquiring synchronization status messages and comparing them.

In accordance with the present invention, synchronization status messages are sent and received between the master unit and slave units only when quality changes; synchronization status messages are not sent and received if there is no change in quality. This makes it possible to lighten the load on the units, especially the master unit.

In accordance with the present invention, a synchronization status message indicating the quality level of a master clock is sent and received between the master unit and slave units only when the quality of the master clock changes; synchronization status messages are not sent and received if there is no change in quality. This makes it possible to lighten the load on the shelves, especially the master shelf.

Even if a slave unit uses a self-timing clock such as an HO (holdover) clock or INT (internal) clock during the execution of processing for deciding a master clock, the slave unit does not notify the master unit of the synchronization status message indicating the quality level of this clock. Consequently, during the short period of time over which processing for deciding the master clock is executed, a synchronization status message indicating the quality of a clock used by each unit is not changed and sent to another transmission apparatus in the network. As a result, this other transmission apparatus can maintain network synchronization without needless changeover of clocks.

In accordance with the present invention, the master unit is internally provided with a clock processor (system timing processor) which sends the master clock to a slave unit and the occurrence of failure in the system timing processor is monitored. If such failure occurs, the master unit notifies the slave unit to this effect and the master and slave units cooperate in inserting, in all main signals transmitted, the synchronization status message DUS indicating that the clock signals included in these main signals are not usable. As a consequence, another transmission apparatus in the network cannot use a clock included in a SONET signal sent from a transmission apparatus whose system timing processor in the master unit has malfunctioned. This makes it possible to prevent loss of network synchronization.

In accordance with the present invention, the slave unit is internally provided with a clock processor (system timing processor) for extracting a clock from a main signal, transmitting the clock to the master unit and executing signal processing using a master clock sent from the master unit. The occurrence of failure in this system timing processor is monitored. If such failure occurs, the slave unit notifies the master unit to this effect via a processor interconnecting cable and the master unit cooperates with the slave unit in inserting, in all main signals transmitted from the slave unit, the synchronization status message DUS indicating that the clock signals included in these main signals are not usable. As a consequence, another transmission apparatus in the network cannot use a clock included in a SONET signal sent from a slave unit whose system timing processor has malfunctioned. This makes it possible to prevent loss of network synchronization.

In accordance with the invention, occurrence of failure in a clock cable is monitored. When occurrence of clock cable failure is detected, the slave unit performs signal processing using a clock internally generated by the slave unit itself and notifies the master unit, via the processor interconnecting cable, of a synchronization status message indicating the quality level of this clock. The master unit cooperates with the slave unit in inserting, in all main signals transmitted from the slave unit, the synchronization status message of which notification has been given. As a result, even if a cable for sending the master clock is severed and slave shelves use the holdover clock or internal clock, synchronization status messages indicating the qualities of these clocks can be reliably inserted into main signals sent from the slave shelves.

As many apparently widely different embodiments of the present invention can be made without departing from the spirit and scope thereof, it is to be understood that the invention is not limited to the specific embodiments thereof except as defined in the appended claims.

What is claimed is:

1. A method of synchronization status message processing in a transmission apparatus equipped with a plurality of units to which main signals are input for subjecting these main signals to predetermined processing and then transmitting the main signals, one of these units being a master unit and the others being slave units, the master unit deciding, as a master clock, a clock extracted from a main signal into which a synchronization status message indicative of best quality level has been inserted from among synchronization status messages inserted into the main signals input to each of the units, each unit executing signal processing in synchronization with this master clock, the method comprising the steps of:

connecting the master unit and the slave units by a clock cable which sends and receives a clock and a processor interconnecting cable for communication between processors provided in the master unit and the slave units;

identifying, in each slave unit, a synchronization status message that has been inserted into a main signal input from a line and notifying the master unit of this synchronization status message via the processor interconnecting cable; and obtaining, in the master unit, a synchronization status message indicating best quality level using synchronization status messages acquired from the master units and synchronization status messages acquired from the slave units, and adopting, as a master clock, a clock extracted from a main signal in which the synchronization status message obtained has been inserted.

2. The method according to claim 1, wherein the master unit identifies a synchronization status message that has been inserted into an input main signal, and obtains a synchronization status message indicating best quality level from among the synchronization status message identified and synchronization status messages acquired from the slave units.

3. The method according to claim 2, further comprising the steps of:

extracting, in each slave unit, a clock from a main signal input from a line and sending this clock to the master unit via the clock cable; and sending the clock adopted as the master clock from the master unit to each slave unit via the clock cable.

4. The method according to claim 3, wherein only when a synchronization status message that has been inserted into a main signal changes, the slave unit notifies the master unit of this synchronization status message via the processor interconnecting cable, and the master unit responds to receipt of this new synchronization status message by starting processing which decides the master clock.

5. The method according to claim 3, further comprising the steps of:

notifying the slave units, via the processor interconnecting cable, of a synchronization status message indicating the quality level of the master clock; and inserting, in each slave unit, the synchronization status message of which notification has been given into a main signal.

6. The method according to claim 5, wherein only when the quality level of a master clock decided by the processing which decides the master clock is different from a currently prevailing quality level, the master unit notifies the slave units, via the processor interconnecting cable, of the synchronization status message indicative of this different quality level.

7. The method according to claim 5, wherein during the processing which decides the master clock, each unit executes signal processing using a clock internally generated by the unit itself and inhibits notification of the master unit of the synchronization status message indicative of the quality level of this clock.

8. The method according to claim 3, further comprising the steps of:

internally providing the master unit with a clock processor for receiving clocks from slave units and sending the slave units a clock decided upon as the master clock from among these clocks;

monitoring occurrence of failure of the clock processor in the master unit;

in the event of detection of failure of the clock processor, notifying the slave units of occurrence of the failure via the processor interconnecting cable; and inserting, into all main signals sent from the transmission apparatus, a synchronization status message indicating that the clocks included in these main signals are not usable.

9. The method according to claim 3, further comprising the steps of:

internally providing each slave unit with a clock processor for extracting a clock from a main signal, transmitting the clock to the master unit and executing signal processing using a master clock sent from the master unit;

monitoring occurrence of failure of the clock processor in each slave unit; and in the event of detection of failure of the clock processor, notifying the master unit of occurrence of the failure via the processor interconnecting cable.

10. The method according to claim 9, further comprising the steps of:

inserting, into a main signal sent from the slave unit, a synchronization status message indicating that the clock included in the main signal is not usable.

11. The method according to claim 3, further comprising the steps of:

monitoring occurrence of failure of the clock cable in each slave unit; and in the event of detection of failure of the clock cable, executing signal processing using a clock internally generated by the slave unit itself and notifying the master unit, via the processor interconnecting cable, of a synchronization status message indicating the quality level of this clock.

12. The method according to claim 11, further comprising the step of inserting, into a main signal sent from the slave unit, a synchronization status message indicating the quality level of said clock.

* * * * *

UNITED STATES PATENT AND TRADEMARK OFFICE
CERTIFICATE OF CORRECTION

PATENT NO : 6,041,066
DATED : March 21, 2000
INVENTOR(S): SEIJI MEKI, ET AL.

It is certified that error appears in the above-identified patent and that said Letters Patent is hereby corrected as shown below:

On the title page,
Item 75: Correct Residence of Inventor's SEIJI MEKI and SHUNJI YAMADA to read "BOTH OF KANAZAWA"

Item 30: Correct Foreign Application Priority Data date to "SEPTEMBER 1, 1997."

Signed and Sealed this

Twenty-seventh Day of March, 2001

Attest:

NICHOLAS P. GODICI

Attesting Officer

Acting Director of the United States Patent and Trademark Office